US012516027B2

(12) United States Patent
Chang et al.

(10) Patent No.: US 12,516,027 B2
(45) Date of Patent: Jan. 6, 2026

(54) LAPPACONITINE DERIVATIVE AND USE THEREOF

(71) Applicant: QGENETICS CO., LTD., Seoul (KR)

(72) Inventors: Mun Seog Chang, Seoul (KR); Tae Hee Lee, Daejeon (KR); Ha Young Kim, Seoul (KR); Jung Bin Min, Seoul (KR)

(73) Assignee: QGENETICS CO., LTD., Seoul (KR)

( * ) Notice: Subject to any disclaimer, the term of this patent is extended or adjusted under 35 U.S.C. 154(b) by 704 days.

(21) Appl. No.: 17/905,797

(22) PCT Filed: Mar. 5, 2021

(86) PCT No.: PCT/KR2021/002757
§ 371 (c)(1),
(2) Date: Sep. 7, 2022

(87) PCT Pub. No.: WO2021/182806
PCT Pub. Date: Sep. 16, 2021

(65) Prior Publication Data
US 2024/0083850 A1 Mar. 14, 2024

(30) Foreign Application Priority Data
Mar. 9, 2020 (KR) ........................ 10-2020-0028973

(51) Int. Cl.
*C07D 223/32* (2006.01)
*A61K 9/20* (2006.01)
*A61K 9/48* (2006.01)
*A61K 47/26* (2006.01)

(52) U.S. Cl.
CPC .......... *C07D 223/32* (2013.01); *A61K 9/2013* (2013.01); *A61K 9/2018* (2013.01); *A61K 9/2027* (2013.01); *A61K 9/2059* (2013.01); *A61K 9/4825* (2013.01); *A61K 9/4858* (2013.01); *A61K 9/4866* (2013.01); *A61K 47/26* (2013.01)

(58) Field of Classification Search
CPC .................................................. C07D 223/32
See application file for complete search history.

(56) References Cited

U.S. PATENT DOCUMENTS

| 2018/0093966 A1 | 4/2018 | Liang et al. |
| 2021/0015881 A1 | 1/2021 | Samorodov |

FOREIGN PATENT DOCUMENTS

| CN | 1305811 A | 8/2001 |
| CN | 101143847 A | 3/2008 |
| CN | 107540680 A | 1/2018 |
| WO | WO-2017209653 A1 | 12/2017 |

OTHER PUBLICATIONS

American Chemical Society. Chemical Abstract Service. RN 32854-75-4. Entered into STN: Nov. 16, 1984. (Year: 1984).*
Li, Z., et al., "Oxidation of the Norditerpenoid Alkaloids Isotalatizidine and 6-Epiforsticine," Chin Chem Lett 11(5):421-424, Elsevier, Netherlands (May 2000).
Vasilevskii, S.F., et al., "Synthesis of Acetylene Derivatives of Lappaconitine ," Doklady Chemistry, 415(2):181-185, Springer Nature, Germany (Aug. 2007).
Wiesner, K., et al., "The Structure of Aconitine," Collect Czechoslov Chem Commun 28(9):2462-2478, Wiley-VCH, Germany (Sep. 1963).
Berge, S.M., et al., "Pharmaceutical salts," J. Pharm. Sci. 66(1):1-19, Elsevier, Netherlands (1977).
Bharadwaj, S., et al., "Milk ribonuclease-enriched lactoferrin induces positive effects on bone turnover markers in postmenopausal women," Osteoporos. Int. 20(9):1603-1611, SpringerLink, Germany (2009).
Bruderer, M., et al., "Role and regulation of RUNX2 in osteogenesis," Eur Cell Mater. 28:269-286, AO Research Institute, Switzerland (2014).
Garg, P., et al., "Prospective Review of Mesenchymal Stem Cells Differentiation into Osteoblasts," Orthop. Surg. 9(1):13-19, Tianjin Hospital and John Wiley & Sons Australia, Ltd., Australia (2017).
Greenblatt, M.B., et al., "Mitogen-activated protein kinase pathways in osteoblasts," Annu. Rev. Cell Dev. Biol. 29:63-79, Annual Reviews, United States (2013).
International Search Report for International Application No. PCT/KR2021/002757, Korean Intellectual Property Office, Daejeon, South Korea, mailed on Jun. 11, 2021, 7 pages.
Lee, N.K., et al., "Endocrine regulation of energy metabolism by the skeleton," Cell 130(3):456-469, Cell Press, United States (2007).
Sun, J., et al., "Role of bone morphogenetic protein-2 in osteogenic differentiation of mesenchymal stem cells," Mol. Med. Rep. 12(3):4320-4237, Spandidos Publications, Greece (2015).
Tsyrlina, E.M., et al., "Isoxazolidine derivatives of lappaconitine and talatisamine," Chemistry of Natural Compounds 54(3):515-519, Springer Science+Business Media, Germany (2018).
Turabekova, M.A., et al., "Aconitum and Delphinium alkaloids "Drug-likeness" descriptors related to toxic mode of action," Environ. Toxicol. Pharmacol. 25(3):310-320, Elsevier, Netherlands (2008).
Wang, J.L., et al., "Structure-analgesic activity relationship studies on the C(18)- and C(19)-diterpenoid alkaloids," Chem. Pharm. Bull. (Tokyo). 57(8):201-208, Pharmaceutical Society of Japan, Japan (2009).

(Continued)

*Primary Examiner* — John S Kenyon
(74) *Attorney, Agent, or Firm* — Myers Bigel, P.A.

(57) ABSTRACT

The present invention pertains to a novel lappaconitine derivative, a method for producing same, and a pharmaceutical use thereof using osteogenesis-promoting activity. The lappaconitine derivative induces the differentiation of stem cells into osteoblasts, increases bone mineral density when administered to animal models of osteoporosis, and induces bone formation in animal models of bone fracture, and thus can be advantageously used for preventing, ameliorating, or treating bone-related diseases such as osteoporosis, as well as treating non-disease fractures caused by physical trauma.

12 Claims, 23 Drawing Sheets

(56) References Cited

OTHER PUBLICATIONS

Xu, H., et al., "Pain-relieving effects of processed Aconiti tuber in CCI-neuropathic rats," J. Ethnopharmacol. 275:114126, Elsevier, Netherlands (2006).

* cited by examiner

LAPPACONITINE DERIVATIVE AND USE THEREOF

TECHNICAL FIELD

The present invention relates to a novel lappaconitine derivative belonging to the diterpenoid alkaloid family, a method of preparing the same, and a pharmaceutical use thereof using osteogenesis-promoting activity.

BACKGROUND ART

Aconitine, which is one of components of *Aconiti lateralis* Radix as an herbal medicine, is the most toxic chemical compound that belongs to the alkaloid family. However, when *Aconiti lateralis* Radix is boiled into a decoction, it has reduced toxicity. Similarly, when heat is directly applied to such a compound, it is converted into less toxic compounds such as benzoylaconine, aconine, and the like through deacetylation or debenzoylation. Based on this principle, *Aconiti lateralis* Radix (processed *Aconiti lateralis* Radix or purified *Aconiti lateralis* Radix) whose toxicity is reduced through the heat treatment has been used as an herbal drug to reduce inflammation and pain in patients with neuralgia (Xu et al., *J Ethnopharmacol* 2006).

Separately, hundreds of various alkaloid compounds, such as deoxyaconitine, mesaconitine, hypaconitine, lappaconitine, and the like, which have a similar chemical structure, and belong to the diterpenoid alkaloid family such as aconitine, have been studied through semisynthesis and structural confirmation, and their biological activity has also been elucidated (Turabekova et al., *Environ Toxicol Pharmacol.* 2008). For example, Shaanxi University of Science & Technology has released the results showing that lappaconitine exhibits anticancer activity by removing a 2-acetaminobenzoyl group at the carbon 4 position of lappaconitine and attaching various cinnamic derivatives thereto. The same university has also synthesized various compounds by varying the group at position 4 and functional groups at positions 8 and 9 (Liangcheng et al., CN 107540680 A, published on Jan. 5, 2018). Dr Vladimirovich (Russia) has also confirmed the inflammatory action of lappaconitine derivatives to which various aromatic compounds are attached at position 4 of lappaconitine (S. V. Vladimirovich, WO 2017/209653 A1).

Among many alkaloid compounds, lappaconitine is known to exhibit various effects such as antiarrhythmic, anti-inflammatory, antioxidant, anticancer, and antiepileptic effects (Wang et al., Chem Pharm Bull. 2009). The present inventors have prepared a compound having a new structure by hydrolyzing lappaconitine while conducting research on new pharmacological activities of lappaconitine, and found that the novel compound promotes osteogenesis. Therefore, the present invention has been completed based on these facts.

DISCLOSURE

Technical Problem

According to one aspect of the present invention, the present invention is directed to providing a novel lappaconitine derivative having an osteogenesis-promoting function and an ability to treat osteoporosis, a method of preparing the same, and a pharmaceutical composition for preventing, ameliorating or treating a bone-related disease, which included the novel lappaconitine derivative as an active ingredient.

Technical Solution

To achieve the objects of the present invention as described above, according to one aspect of the present invention, there is provided a compound represented by the following Formula 1, and a stereoisomer, a hydrate, a solvate, or a pharmaceutically acceptable salt thereof:

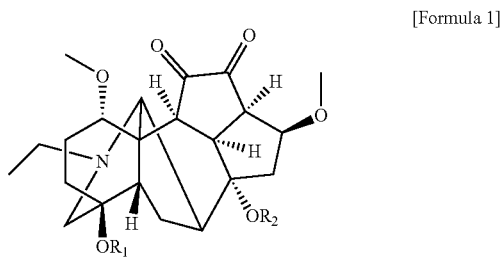

[Formula 1]

According to one embodiment of the present invention, in Formula 1, $R_1$ and $R_2$ may each be independently selected from the group consisting of hydrogen, a C1-C6 alkyl, a thioalkyl, an arylalkyl, a hydroxyalkyl, a dihydroxyalkyl, a hydroxy alkylarylalkyl, a dihydroxyalkylarylalkyl, an alkoxyalkyl, an acyloxyalkyl, an aminoalkyl, an alkylaminoalkyl, an alkoxycarbonylaminoalkyl, an acylaminoalkyl, an arylsulfoneamidoalkyl, an allyl, a dihydroxyalkylallyl, a dioxolanylallyl, a caralkoxyalkyl, methyl, ethyl, isopropyl, t-butyl, and phenyl. Here, the term "alk-" or "alkyl" is branched or linear, and preferably refers to a C1-C3 alkyl, wherein an ether (—O—) linkage may be optionally interposed in the carbon chain.

According to one embodiment of the present invention, the compound of Formula 1 is (2aR,2a1S,3S,4aS,8S,11S,11bS,12S)-6-ethyl-4a,8-dihydroxy-3,11-dimethoxy-tetradecahydro-8,11a,5-(epiethane[1,1,2]triyl)cyclopenta[7,1]indeno[5,4-b]azocin-1,2-dione (Formula 2).

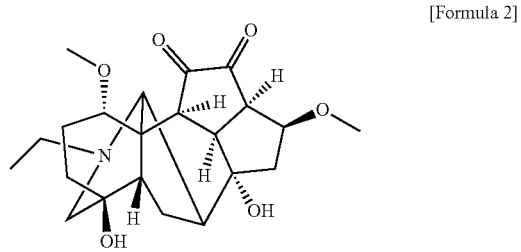

[Formula 2]

In the present invention, the compound of Formula 1 includes a hydrate, a solvate, stereoisomer, and a radioactive derivative thereof, as well as the compound represented by Formula 1 and a pharmaceutically acceptable salt thereof.

The term "pharmaceutically acceptable salt" refers to a salt that is suitable for use in contact with the tissue from humans and lower animals without causing excessive toxicity, stimulations, allergic reactions, and the like within the scope of sound medical judgment and does not have an adverse effect on the biological activity and physicochemical properties of a parental compound. The pharmaceutically acceptable salt is well known in the art. For example, the pharmaceutically acceptable salts are described in detail in S. M. Berge et al., J. Pharmaceutical Sciences, 66, 1, 1977. The salt may be prepared in situ while finally separating and purifying the compound of the present invention, or separately prepared through a reaction with an inorganic base or an organic base. For example, suitable addition salt forms include ammonium salts; alkali metal salts such as salts of lithium, sodium, potassium, magnesium, calcium, and the like, and alkaline earth metal salts (calcium salt, and the like); salts with organic bases, for example, primary, secondary, and tertiary aliphatic and aromatic amines (such as methylamine, ethylamine, propylamine, isopropylamine), quaternary butylamine isomers, dimethylamine, diethylamine, diethanolamine, dipropylamine, diisopropylamine, di-n-butylamine, pyrrolidine, piperidine, morpholine, trimethylamine, triethylamine, tripropylamine, quinuclidine, pyridine, quinoline and isoquinoline, benzathine, N-methyl-D-glucamine, 2-amino-2-(hydroxymethyl)-1,3-propanediol, hydrabamine salt; and salts with amino acids such as arginine, lysine, and the like.

In the present invention, the hydrate or solvate of the compound of Formula 1 may be prepared using a conventional method, for example prepared by dissolving the base compound of Formula 1 in a solvent such as water, methanol, ethanol, acetone, 1,4-dioxane, adding a free acid or a free base thereto, and crystallizing or recrystallizing the resulting mixture.

Also, the compound of Formula 1 may have one or more asymmetric centers. In this case, an enantiomer or a diastereoisomer may be present for such a compound. Therefore, the compound of the present invention includes either an enantiomer or a diastereoisomer or an isomer mixture thereof. Also, the different isomers may be separated or decomposed using a conventional method, or any isomers may be obtained by a conventional synthesis method or through stereospecific or asymmetric synthesis. In addition, the compound of the present invention includes radioactive derivatives of the compound represented by Formula 1, and these radioactive compounds are useful in the field of biological research.

In the present invention, the compound of Formula 1 may be prepared using a method which includes the following steps:

(a) allowing lappaconitine to react with an oxidizing agent; and
(b) allowing the reaction product of (a) to react with an organic solvent in the presence of a base.

According to one embodiment of the present invention, the lappaconitine of (a) may be lappaconitine hydrogen bromide. In this case, the step (a) may further include removing hydrogen bromide before allowing the lappaconitine to react with the oxidizing agent. For example, the removing of the hydrogen bromide from the lappaconitine hydrogen bromide may be performed using dichloromethane ($CH_2Cl_2$) in the presence of a base as described in the following Scheme 1.

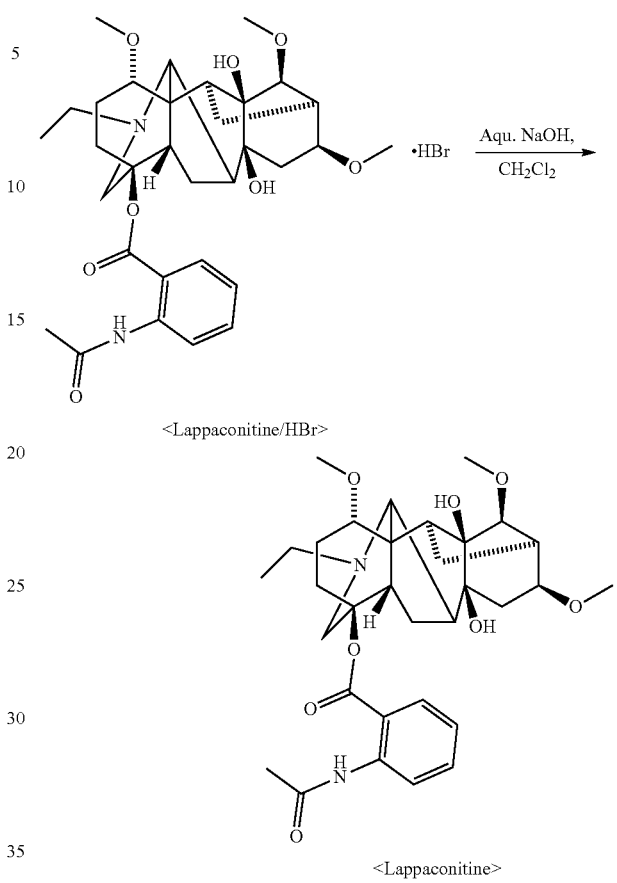

Next, the lappaconitine may be oxidized through reaction with an oxidizing agent, as shown in the following Scheme 2, thereby generating a lappaconitine derivative (LAD). The oxidizing agent may be selected from the group consisting of phenyliodine diacetate ($PhI(OAc)_2$ or lead (II) acetate ($Pb(CH_3CO_2)_2$), lead (II) acetate ($Pb(CH_3CO_2)_4$), ozone, and $HIO_4$, each of which is dissolved in dimethylformamide (DMF).

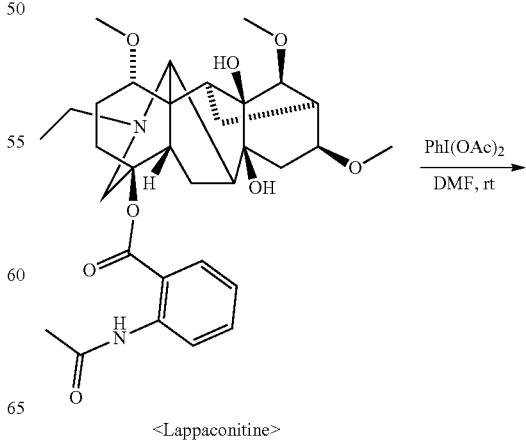

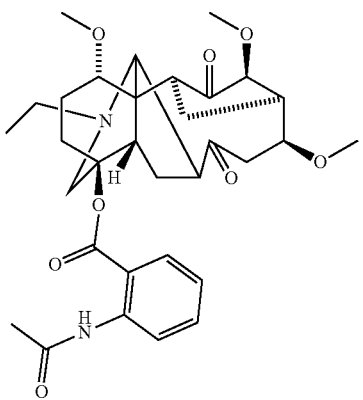

<LAD (Intermediate)>

In the present invention, the synthesized lappaconitine derivative (LAD) may be allowed to react with an organic solvent in the presence of a base in order to generate the compound of Formula 1. The base may be selected from the group consisting of sodium hydroxide, potassium carbonate, sodium carbonate, cesium carbonate, and potassium hydroxide, and the organic solvent may be an aliphatic alcohol or an alkoxy alcohol.

The aliphatic alcohol refers to an alcohol represented by the general formula: $CH_3(CH_2)nOH$ (wherein n is 0 or a positive integer), and the alkoxy alcohol refers to an alcohol represented by the general formula: $CH_3(CH_2)nO(CH_2)nCH_3$ (wherein n is each independently 0 or a positive integer). For example, the aliphatic alcohol may be specifically methanol, ethanol, n-propanol, isopropanol, n-butanol, and the like, and the alkoxy alcohol may be methoxymethanol, methoxyethanol, ethoxyethanol, and the like.

For example, the lappaconitine derivative (LAD) may be allowed to react with ethanol in the presence of sodium hydroxide to generate the compound (QG3030) of Formula 1, as shown in the following Scheme 3.

[Scheme 3]

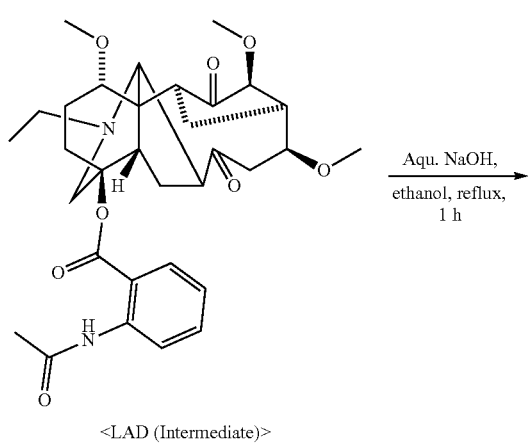

<LAD (Intermediate)>

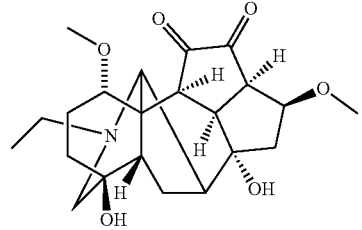

<QG3030>

In the present invention, the compound of Formula 1 synthesized by the method may be separated using typical separation and purification processes, for example, by diluting the mixture in an organic solvent, washing the mixture, and concentrating an organic layer under reduced pressure. When necessary, the compound of Formula 1 may be purified by column chromatography and a recrystallization method using various solvents.

The present inventors have synthesized the novel compound of Formula 1 by hydrolyzing lappaconitine, which has anti-inflammatory, antioxidant, anticancer effects, and the like, while conducting research on new pharmacological activities of the lappaconitine, and found that such a compound has osteogenesis-promoting activity.

Therefore, another aspect of the present invention provides a pharmaceutical composition for preventing or treating a bone-related disease, which includes the compound represented by Formula 1 or a pharmaceutically acceptable salt thereof as an active ingredient.

In the pharmaceutical composition, the compound represented by Formula 1 or pharmaceutically acceptable salt thereof includes a hydrate, a solvate, a stereoisomer, and a radioactive derivative thereof.

According to one embodiment of the present invention, the compound of Formula 1 may promote the differentiation of stem cells into osteoblasts, and increase the expression of an osteogenic marker selected from the group consisting of runt-related transcription factor 2 (RUNX2), bone morphogenetic protein 2 (BMP2), and osteocalcin, and thus may aid in osteogenesis. Mesenchymal stem cells, hematopoietic stem cells, adipose stem cells, bone marrow stem cells, and the like may be used as the stem cells.

In the present invention, the bone-related disease may be selected from the group consisting of osteoporosis, bone fractures, rheumatoid arthritis, periodontitis, osteomalacia, osteopenia, bone atrophy, osteoarthritis, bone defects, osteolysis, and osteonecrosis. Preferably, the bone-related disease may be bone fractures and osteoporosis.

The term "bone fracture" as used in this specification refers to a condition in which bone that supports the body is broken by traffic accidents, falls, industrial accidents, and other physical stimuli.

The term "osteoporosis" as used in this specification refers to a condition in which a microstructure of the bone tissue degenerates due to a decrease in minerals (particularly calcium) and matrices, which constitute bone, resulting in a consistent rise in the risk of bone fracture. Types of osteoporosis includes primary osteoporosis such as postmenopausal osteoporosis and senile osteoporosis, and secondary osteoporosis caused by diseases, drugs, drinking, smoking, and the like, all of which affect the formation and loss of bone.

The pharmaceutical composition of the present invention may further include a carrier, an excipient, and a diluent suitable for common use in the preparation of medicines in addition to the compound of Formula 1 included as the active ingredient. The carrier, the excipient, and the diluent that may be included in the pharmaceutical composition of the present invention include lactose, dextrose, sucrose, sorbitol, mannitol, xylitol, erythritol, maltitol, starch, acacia gum, alginate, gelatin, calcium phosphate, calcium silicate, cellulose, methyl cellulose, microcrystalline cellulose, polyvinyl pyrrolidone, water, methylhydroxybenzoate, propylhydroxybenzoate, talc, magnesium stearate, mineral oil, and the like.

When the pharmaceutical composition of the present invention is formulated, the pharmaceutical composition is prepared using a commonly used diluent or excipient such as a filler, an extender, a binder, a wetting agent, a disintegrant, a surfactant, and the like. A solid preparation for oral administration includes a tablet, a pill, a powder, a granule, a capsule, and the like. Such a solid preparation is prepared by mixing the composition of the present invention with one or more excipients, for example, starch, calcium carbonate, sucrose or lactose, gelatin, and the like. Also, lubricants such as magnesium stearate, talc, and the like are used in addition to the simple excipients. A liquid preparation for oral administration, such as a suspension, a solution, an emulsion, a syrup, and the like, may include various excipients, for example, a wetting agent, a sweetening agent, a flavoring agent, a preservative, and the like in addition to commonly used simple diluents (such as water, liquid paraffin, and the like). A preparation for parenteral administration includes a sterile aqueous solution, a non-aqueous solvent, a suspension, an emulsion, a lyophilized preparation, a suppository, and the like. Propylene glycol, polyethylene glycol, a vegetable oil such as olive oil, and the like, injectable esters such as ethyl oleate, and the like may be used as the non-aqueous solvent and the suspension.

The pharmaceutical composition of the present invention may be orally or parenterally administered, and a preferred dose of the composition of the present invention may depend on the condition and weight of a patient, the severity of a disease, the type of drug, a route of administration, and the administration duration, but may be suitably selected by those skilled in the art. For example, the dose of the compound of Formula 1 may depend on the age, weight, and gender of a patient, an administration mode, the health condition, and the severity of a disease. To an adult patient weighing 70 kg, the compound of Formula 1 may be generally administered daily at a dose of 0.01 mg to 5,000 mg. The dose may be administered once a day or in divided doses. In this case, the dose is intended to limit the scope of the present invention in any way.

Also, the present invention provides a method of treating a bone-related disease, which includes administering the pharmaceutical composition to a subject in need of treatment. The type of bone-related disease and the dose of the pharmaceutical composition are as described above in the pharmaceutical composition for preventing or treating a bone-related disease.

In the present invention, when the pharmaceutical composition for preventing or treating a bone-related disease is orally administered, the pharmaceutical composition for oral administration may be a solid preparation, a semisolid preparation, or a liquid preparation for oral administration. The solid preparation for oral administration may be, for example, a tablet, a pill, a hard or soft capsule, a powder, a fine granule, a granule, a powder for reconstituting a solution or a suspension, a lozenge, a wafer, an oral film (an oral strip) a dragee, a chewable gum, and the like, but the present invention is not limited thereto. The liquid preparation for oral administration includes a solution, a suspension, an emulsion, a syrup, an elixir, a spirit, aromatic water, a lemonade, an extract, a precipitate, a tincture, and an infused oil.

In the present invention, when the pharmaceutical composition for preventing or treating a bone-related disease is used as an injection, the pharmaceutical composition may be directly administered to the site of bone-related disease. When the pharmaceutical composition is formulated into an injection, the injection may include a non-toxic buffered solution, which is isotonic with blood, as the diluent, for example, a phosphate buffered solution having a pH of 7.4. The injection may include other diluents or additives in addition to the buffered solution.

Also, according to one embodiment of the present invention, after the pharmaceutical composition is mixed with an excipient such as a collagen sponge, the pharmaceutical composition may be implanted into a treatment site to treat a subject.

Another aspect of the present invention provides a food composition for preventing or ameliorating a bone-related disease, which includes the compound represented by Formula 1 or a pharmaceutically acceptable salt thereof as an active ingredient.

In the food composition, the compound represented by Formula 1 or a pharmaceutically acceptable salt thereof includes a hydrate, a solvate, and a stereoisomer thereof.

The same components as in the pharmaceutical composition for preventing or treating a bone-related disease are used in the food composition, and thus the overlapping content between the pharmaceutical composition and the food composition is omitted to avoid the unnecessary description of this specification.

In the present invention, the food composition may be provided in the form of a powder, a granule, a tablet, a capsule, a syrup, a drink, or a pill. In this case, the food composition may be used together with other foods or food additives in addition to the compound represented by Formula 1 as the active ingredient, and may be suitably used according to the conventional methods. A mixing amount of the active ingredient may be suitably determined depending on the purpose of use, for example, prevention, health, or therapeutic treatment.

An effective dose of the active ingredient included in the food composition may be used based on the effective dose of the pharmaceutical composition. However, when the active ingredient is taken for a long period for the purpose of health and hygiene or for the purpose of regulating health, the food composition is administered at a dose less than the effective dose range. It is certain that the active ingredient may be used at a dose greater than the effective dose range because the active ingredient has no problems in terms of safety.

The food composition includes components commonly added during the preparation of food. For example, the food composition includes proteins, carbohydrates, fats, nutrients, seasonings, and flavoring agents. Examples of the above-described carbohydrates include monosaccharides, for example glucose, fructose, and the like; disaccharides, for example maltose, sucrose, oligosaccharides, and the like; and polysaccharides, for example conventional sugars, such as dextrin, cyclodextrin, and the like; and sugar alcohols such as xylitol, sorbitol, erythritol, and the like. A natural flavoring agent and a synthetic flavoring agent may be used as the flavoring agent. For example, when the food composition of the present invention is prepared as drinks, the food composition may further include citric acid, liquid fructose, sugar, glucose, acetic acid, malic acid, fruit juice, and the like in addition to the active ingredient of the present invention.

Still another aspect of the present invention provides a composition for inducing the in vitro differentiation into osteoblasts using the compound represented by Formula 1.

According to one embodiment of the present invention, when mesenchymal stem cells are treated with the compound represented by Formula 1, calcium and mineral production may be increased, thereby promoting the differentiation of stem cells into osteoblasts.

Advantageous Effects

A lappaconitine derivative of the present invention induces the differentiation of stem cells into osteoblasts, increases bone mineral density when administered to an animal model of osteoporosis, and promotes osteogenesis when injected into a bone fracture site in an animal model of bone fracture to promote recovery from bone fracture trauma and induce osteogenesis, and thus can be advantageously used for preventing, ameliorating, or treating bone-related diseases such bone fractures and osteoporosis.

BEST MODE

Figure 1:
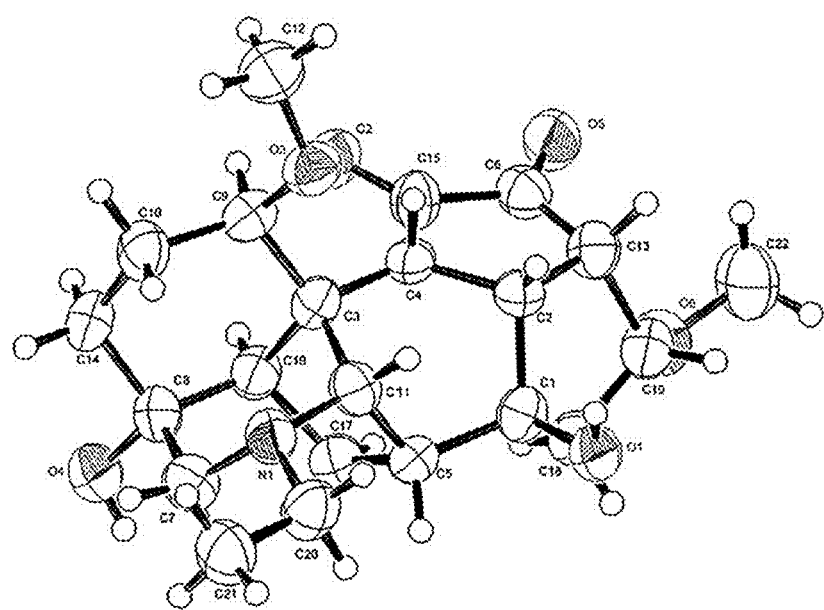
FIG. 1 shows a structure of a lappaconitine derivative (QG3030) according to one embodiment of the present invention.

Hereinafter, one or more embodiments of the present invention will be described in detail with reference to examples thereof. However, it should be understood that the examples are for exemplary illustration and are not intended to limit the scope of the present invention.

Preparation Example: Preparation of QG3030

1-1. Preparation of Lappaconitine

Dichloromethane (500 mL) and a sodium hydroxide solution (10 g of NaOH, and 100 g of water) were added to lappaconitine·hydrogen bromide (10.08 g, 0.017 mol), and an organic layer and an aqueous layer were separated using a separatory funnel. The separated organic layer was washed several times with water, dried over anhydrous magnesium sulfate, and then distilled to obtain the target lappaconitine with a yield of 89% (8.90 g).

$^1$H-NMR (CDCl$_3$, 400 MHz) δ10.98 (s, 1H), 8.60 (d, J=8.4 Hz, 1H), 7.86-7.83 (m, 1H), 7.42 (t, 1H), 6.95 (t, 1H), 3.52-3.37 (m, 2H), 3.36-3.35 (m, 2H), 3.36 (s, J=7.1 Hz, 3H), 3.22 (s, 3H), 3.13 (s, 3H), 3.11-3.09 (m, 2H), 2.60-2.46 (m, 10H), 2.15 (s, 3H), 2.14-1.73 (m, 6H), 1.74-1.68 (m, 1H), 1.74-1.70 (m, 1H), 1.06 (t, J=6.8 Hz, 3H);

$^{13}$C-NMR (CDCl$_3$, 100 MHz) δ169.02, 167.39, 141.6, 134.34, 131.07, 122.31, 120.19, 115.76, 90.10, 84.62, 84.13, 82.89, 78.57, 75.56, 61.48, 57.89, 56.52, 56.10, 55.50, 50.85, 49.86, 48.97, 48.51, 47.61, 44.76, 36.28, 31.83, 26.77, 26.20, 25.53, 24.12, 13.53;

HRMS (ES$^+$): m/z calculated for C$_{32}$H$_{44}$N$_2$O$_8$: 585.3098 [M+H]$^+$.

Found 585.3176.

1-2. Preparation of Lappaconitine Derivative (LAD) from Lappaconitine

Lappaconitine (8.9 g, 0.015 mol) was slowly added to a solution in which phenyliodine diacetate (PhI(OAc)$_2$ (14.07 g, 0.044 mol) was dissolved in dimethylformamide (DMF, 150 mL), and stirred for 10 minutes. When the reaction was completed, the solution was diluted with ethyl acetate (EA), and extracted using an aqueous solution of saturated sodium bicarbonate (NaHCO$_3$). The organic layer was washed several times with water to remove dimethylformamide, dried over anhydrous magnesium sulfate, and then distilled under reduced pressure. The resulting crude product was separated by column chromatography (diethyl ether:ethyl acetate: hexane=3:2:5) to obtain {(3S,6S,7S,9S,11S,16S)-1-ethyl-6,9,11-trimethoxy-8,13-dioxododecahydro-2H-3,6a,14-(epi-ethane[1,1,2]triyl)-7,10-methanocyclodeca[b]azocin-3(4H)-yl 2-acetaminobenzoate} as the target lappaconitine derivative (LAD) with a yield of 25.7% (2.3 g).

$^1$H-NMR (CDCl$_3$, 400 MHz) δ10.99 (s, 1H), 8.62 (d, J=8.4 Hz, 1H), 7.89 (d, J=9.6 Hz, 1H), 7.47-7.43 (m, 1H), 7.01-6.99 (m, 1H), 3.88-3.64 (m, 4H), 3.65 (s, 3H), 3.41 (s, 3H), 3.18 (s, 3H), 2.90-2.25 (5, 4H), 2.20 (s, 3H), 2.19-1.80 (m, 4H), 1.15 (t, J=7.0 Hz, 3H);

$^{13}$C-NMR (CDCl$_3$, 100 MHz) δ 211.85, 204.31, 169.10, 167.40, 162.18, 143.74, 141.74, 134.61, 131.07, 122.41, 120.30, 115.45, 86.92, 82.75, 81.45, 78.21, 76.28, 60.73, 58.17, 57.37, 54.35, 52.98, 50.19, 48.78, 46.06, 45.92, 38.41, 32.06, 25.56, 25.39, 25.36, 12.72;

HRMS (ES$^+$): m/z calculated for C$_{32}$H$_{42}$N$_2$O$_8$: 583.3018 [M+H]$^+$.

Found 583.2941.

1-3. Preparation of QG3030 from LAD

LAD (2.3 g), a sodium hydroxide solution (0.7 g of NaOH and 5.1 g of water), and ethanol (51 mL) were put into a 100-mL 3-necked round bottom flask, and refluxed for an hour. When the reaction was completed, ethanol was distilled off, and the reaction mixture was subjected to column chromatography using ethyl acetate to obtain QG3030 {(2aR,2a1S,3S,4aS,8S,11S,11bS,12S)-6-ethyl-4a,8-dihydroxy-3,11-dimethoxy-tetradecahydro-8,11a,5-(epiethane[1,1,2]triyl)cyclopenta[7,1]indeno[5,4-b]azocin-1,2-dione} as the final compound with a yield of 62.5% (1.4375 g).

$^1$H-NMR (DMSO-d$_6$, 400 MHz) δ8.88 (s, 1H), 4.65 (s, 1H), 4.35 (s, 1H), 4.27-4.20 9m, 1H), 4.10-4.00 (m, 1H), 3.60 (s, 1H), 3.35 (s, 3H), 3.20 (s, 3H), 3.10-2.99 (m, 1H), 2.85-2.19 (m, 6H), 1.99-1.50 (m, 7H), 1.05 (t, J=7.0 Hz, 3H);

$^{13}$C-NMR (CDCl$_3$, 100 MHz) δ 201.20, 149.88, 148.78, 83.25, 79.92, 79.50, 67.87, 62.74, 60.20, 58.10, 53.23, 49.55, 48.86, 47.88, 46.92, 42.39, 38.43, 13.56;

108HRMS (ES$^+$): m/z calculated for C$_{22}$H$_{31}$NO$_6$: 406.2151 [M+H]$^+$.

Found 406.2242; X-ray structure.

1-4. Confirmation of Structure of QG3030

The QG3030 obtained in Preparation Example 1-3 was recrystallized with water, and appropriate crystals were obtained by X-ray diffraction. Thereafter, an X-ray structure of the crystals was determined (X-ray Diffractometer, R-AXIS RAPID). The results are shown in FIG. 1 and Table 1.

TABLE 1

| | |
|---|---|
| Molecular formula | C$_{22}$H$_{31}$NO$_6$ |
| Molecular weight | 405.49 |
| Crystal Color, Habit | Colorless, needle |
| Crystal Dimensions | 0.100 × 0.100 × 0.100 mm |
| Crystal System | Orthorhombic |
| Lattice Type | Primitive |
| Lattice Parameters | a = 8.864(3) · Å |
| | b = 10.579(4) · Å |
| | c = 20.680(7) · Å |
| | V = 1939.1(12) · Å$^3$ |
| Space Group | P2$_1$2$_1$2$_1$ (#19) |
| Z value | 4 |
| D$_{calc}$ | 1.389 g/cm$^3$ |
| F$_{000}$ | 872.00 |
| μ (MoKa) | 1.003 cm$^{-1}$ |

Experimental Example 1: (In Vitro) Confirmation of Efficacy of QG3030

1-1. Confirmation of Osteocytic Differentiation Potential of QG3030 in MSCs Osteoblasts involved in the osteogenesis are formed by differentiating mesenchymal stem cells (MSCs) using external stimuli and transcription factors involved in various signaling pathways (Garg et al., Orthop Surg. 2017). Accordingly, an experiment was performed to check whether QG3030 was able to induce the differentiation of human MSCs into osteoblasts.

MSCs from normal humans were purchased from the American Type Culture Collection (ATCC, U.S.A), and cultured in an MSC-specific culture medium (Gibco). The cultured cells were digested with trypsin, centrifuged, and then seeded in a 24-well plate at a concentration of 3×10$^4$ cells/well. The next day, the MSC culture medium was exchanged with a DMEM (DMEM/10% FBS/penicillin/streptomycin) as an experimental medium, and the cells were treated with QG3030 alone (0.1 μM) or OIM (osteogenesis-inducing medium; StemPro Osteogenesis Differentiation Kit, ThermoFisher Scientific Inc.) as the positive control. Thereafter, the cell culture medium was exchanged with a fresh DMEM every day, treated with QG3030 or OIM, and then cultured for 3 weeks. After the culture was completed, the cells were stained with Alizarin Red for detection of calcium and Von Kossa for detection of mineral production.

Figure 2A:
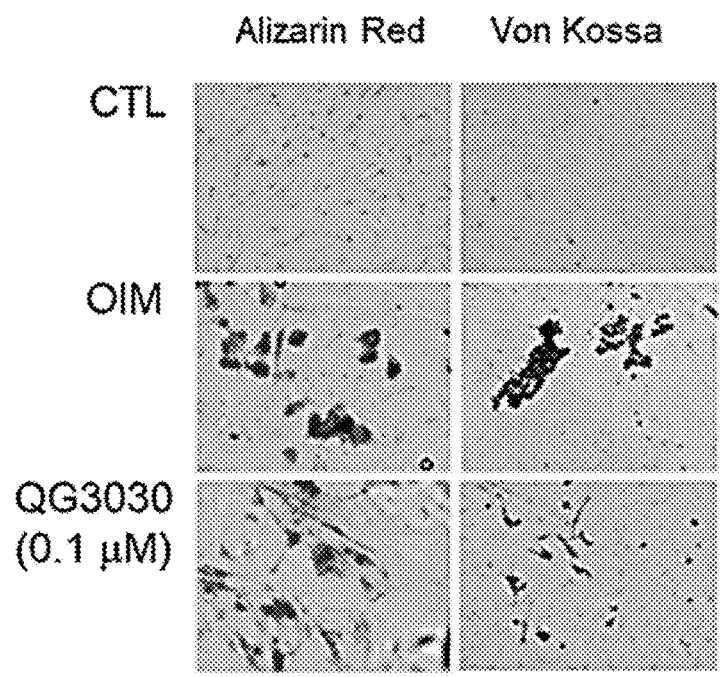
FIG. 2A shows the results of confirming levels of calcium (Alizarin Red) and mineral production (Von Kossa) after mesenchymal stem cells are treated with a lappaconitine derivative (QG3030).
Figure 2B:
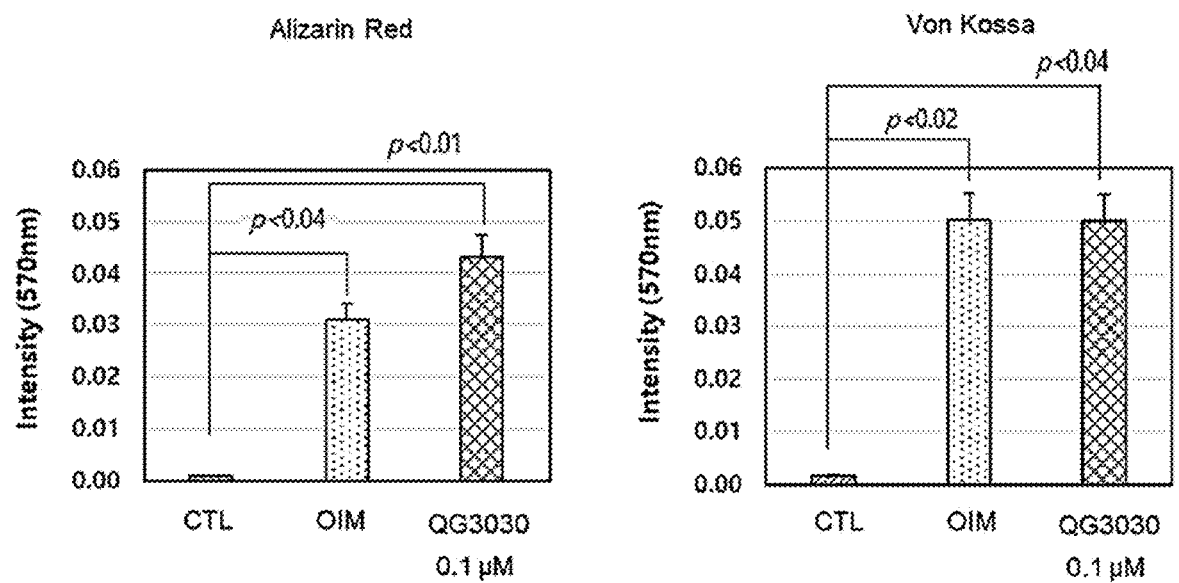
FIG. 2B is a graph showing the staining levels of FIG. 2A.

Based on the staining results, it can be seen that QG3030 induced calcium and mineral production in human MSCs like the OIM as the positive control for osteoblast differentiation (FIGS. 2A and 2B). The results show that the QG3030 may differentiate MSCs into osteoblasts at the cellular level.

1-2. Confirmation of Change in Expression of RUNX2 and BMP2 in MSCs

Runt-related transcription factor 2 (RUNX2; core-binding factor alpha, Cbfa1) is the most important transcriptional regulatory factor for osteogenesis, and is known to be involved in osteoblast differentiation, matrix generation, and mineralization during osteogenesis (Bruderer M, et al., Eur Cell Mater. 2014). Also, RUNX2 itself may be regulated by a bone morphogenetic protein (BMP), which is a type of cytokine (Sun J, et al., Mol Med Rep. 2015). Accordingly, it was confirmed whether QG3030 promotes the expression of osteogenesis-related specific factors to induce osteogenesis.

MSCs were seeded in a 24-well plate at a concentration of $3 \times 10^4$ cells/well, and cultured for 24 hours. From the next day, the MSCs were treated with different concentrations (0.001 µM, 0.01 µM, and 0.1 µM) of QG3030 once a day for 7 days and 14 days. After the experiment was completed, the MSCs were stained with RUNX2 and BMP-2 antibodies, and observed using a fluorescence microscope.

Figure 3A:
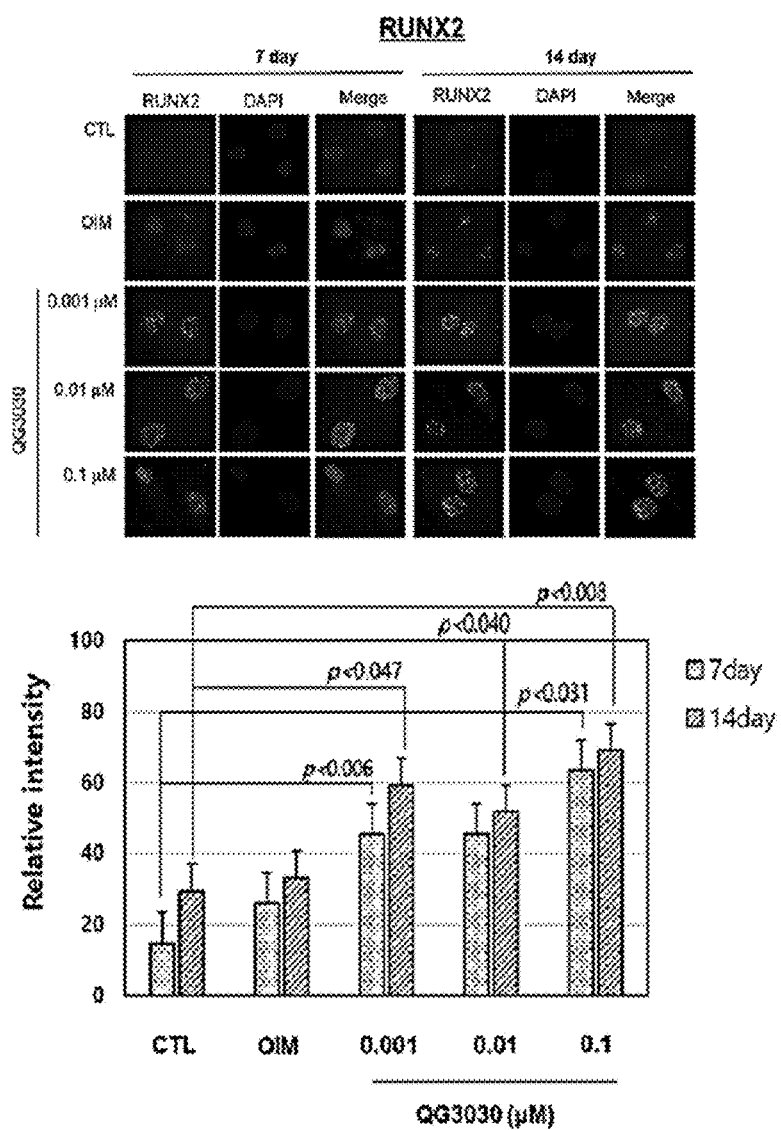
FIG. 3A shows the results of confirming a change in expression of RUNX2 after mesenchymal stem cells are treated with various concentrations of the lappaconitine derivative (QG3030) for a predetermined time.
Figure 3B:
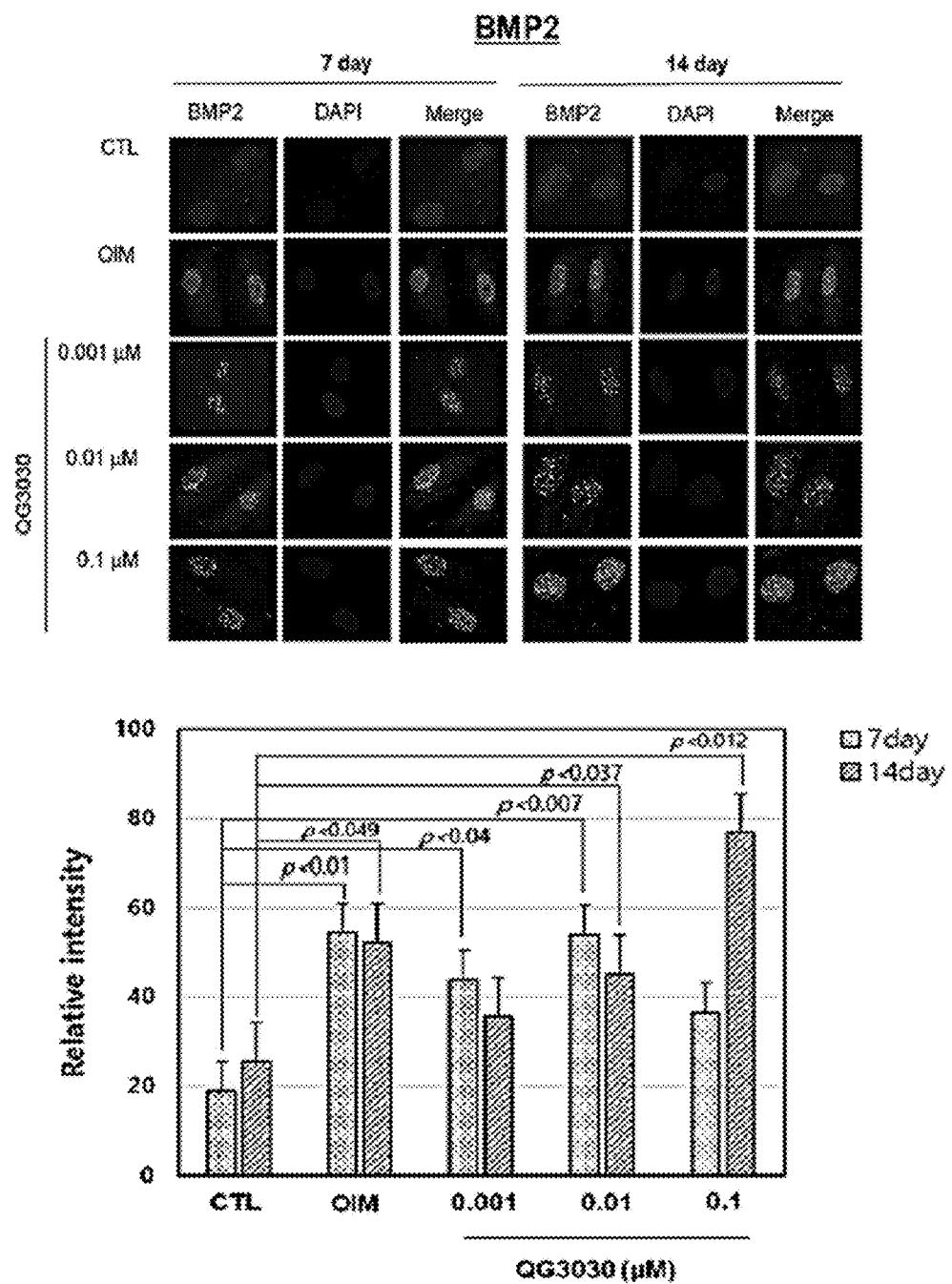
FIG. 3B shows the results of confirming a change in expression of BMP-2 after mesenchymal stem cells are treated with various concentrations of the lappaconitine derivative (QG3030) for a predetermined time.

As a result, it can be seen that QG3030 strongly induced the expression of RUNX2 and BMP-2 even at a low concentration (0.001 µM=1 nM), and this tendency increased with an increasing concentration (FIGS. 3A and 3B). The results show that the QG3030 may be involved in osteogenesis at the molecular level by differentiating human MSCs into osteoblasts.

1-3. Confirmation of Change in Expression of Osteocalcin in MSCs

Osteocalcin is expressed only in osteoblasts (Lee et al., Cell 2007), and is used as a biomarker useful for osteogenesis (Bharadwaj et al., Osteoporosis International., 2009). Accordingly, it was confirmed that LAD had an effect on the expression of osteocalcin which is an osteoblast-specific marker.

Figure 4A:
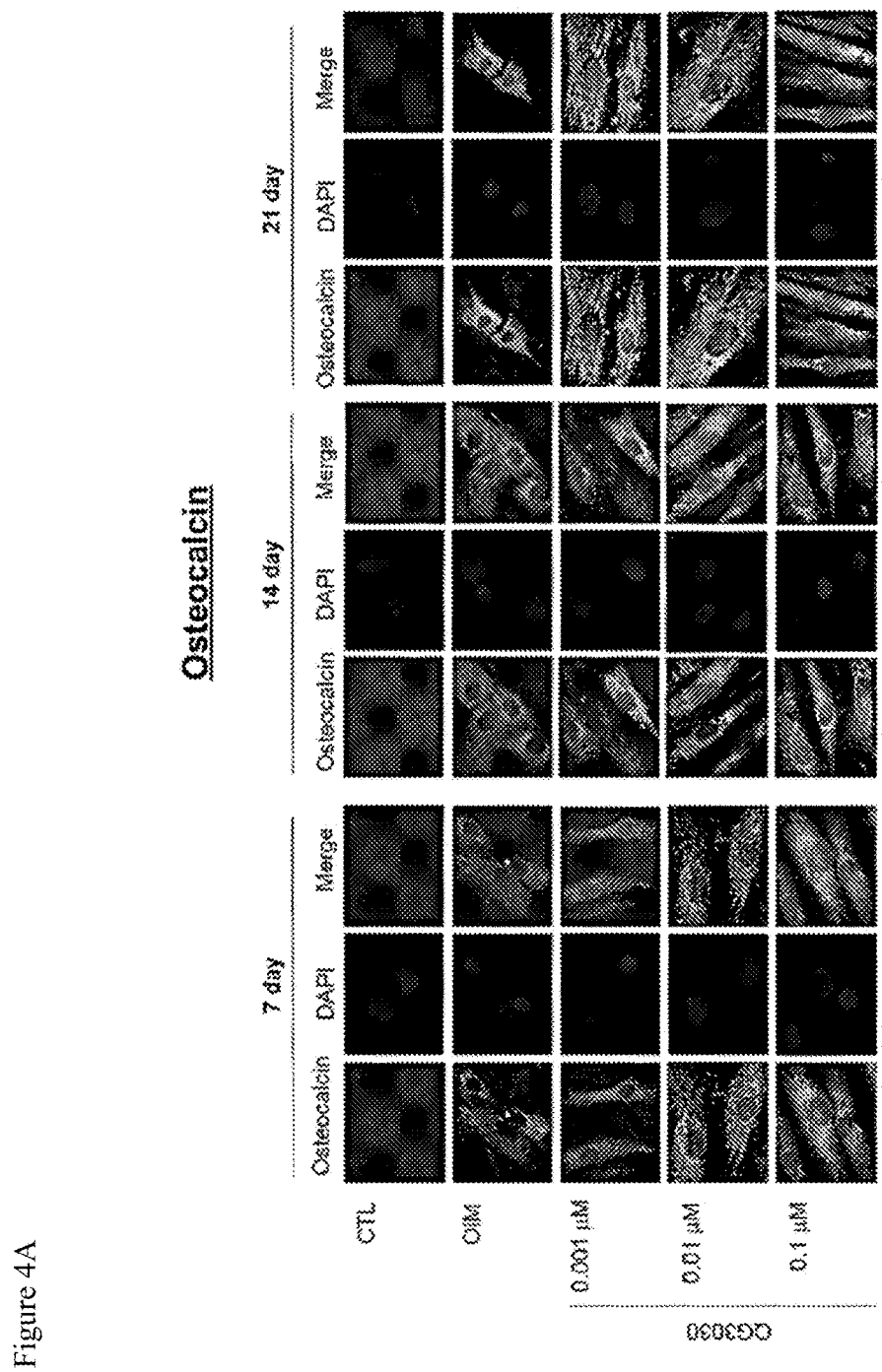
FIG. 4A shows the results of confirming a change in expression of osteocalcin using a fluorescence microscope after mesenchymal stem cells are treated with various concentrations of the lappaconitine derivative (QG3030) for a predetermined time.
Figure 4B:
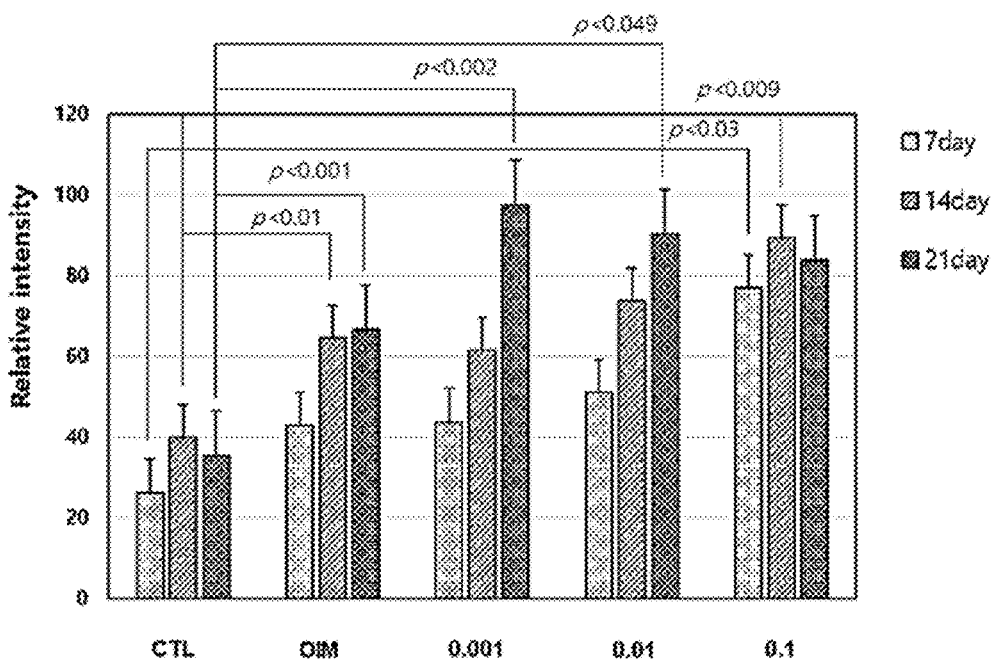
FIG. 4B is a graph showing the fluorescence levels of FIG. 4A.

An experiment was performed in the same manner as described in Experimental Example 1-2, and MSCs were then stained with an osteocalcin antibody, and observed using a fluorescence microscope. As a result, it was confirmed that QG3030 strongly induced the expression of osteocalcin within 7 days after the cells were treated with a low concentration (0.001 µM) of QG3030, indicating that the expression level was similar to that of the OIM-treated group as the positive control (FIGS. 4A and 4B).

1-4. Confirmation of Mechanism of Differentiation of MSCs into Osteoblasts

To study a mechanism by which QG3030 differentiates MSCs into osteoblasts, related signaling was investigated.

MSCs cultured in an experimental DMEM were treated with QG3030 (1 µM) or the control compound (DMSO), and cultured for 24 hours. The cells were recovered, and an experiment was then performed according to a method specified in a phosphokinase antibody array kit (R&D Systems) containing antibodies that specifically recognize phosphorylated forms of 43 kinases. Then, samples were analyzed using an ImageJ (NIH, USA) program.

Figure 5A:
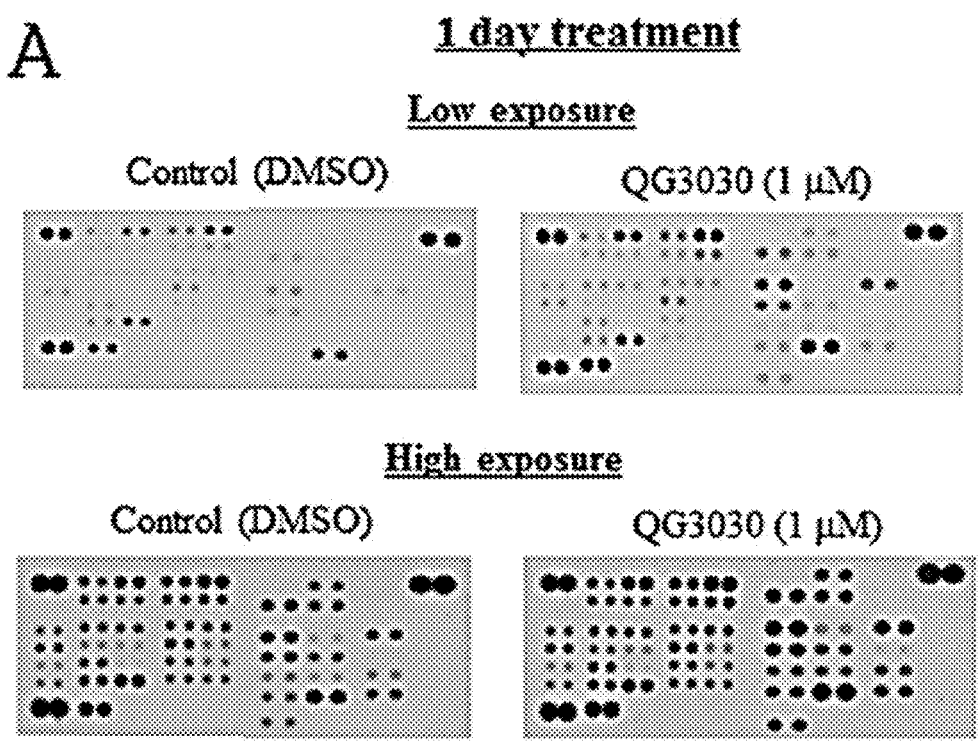
FIG. 5A shows the results of confirming phosphorylation levels of various kinases after mesenchymal stem cells are treated with the lappaconitine derivative (QG3030).
Figure 5B:
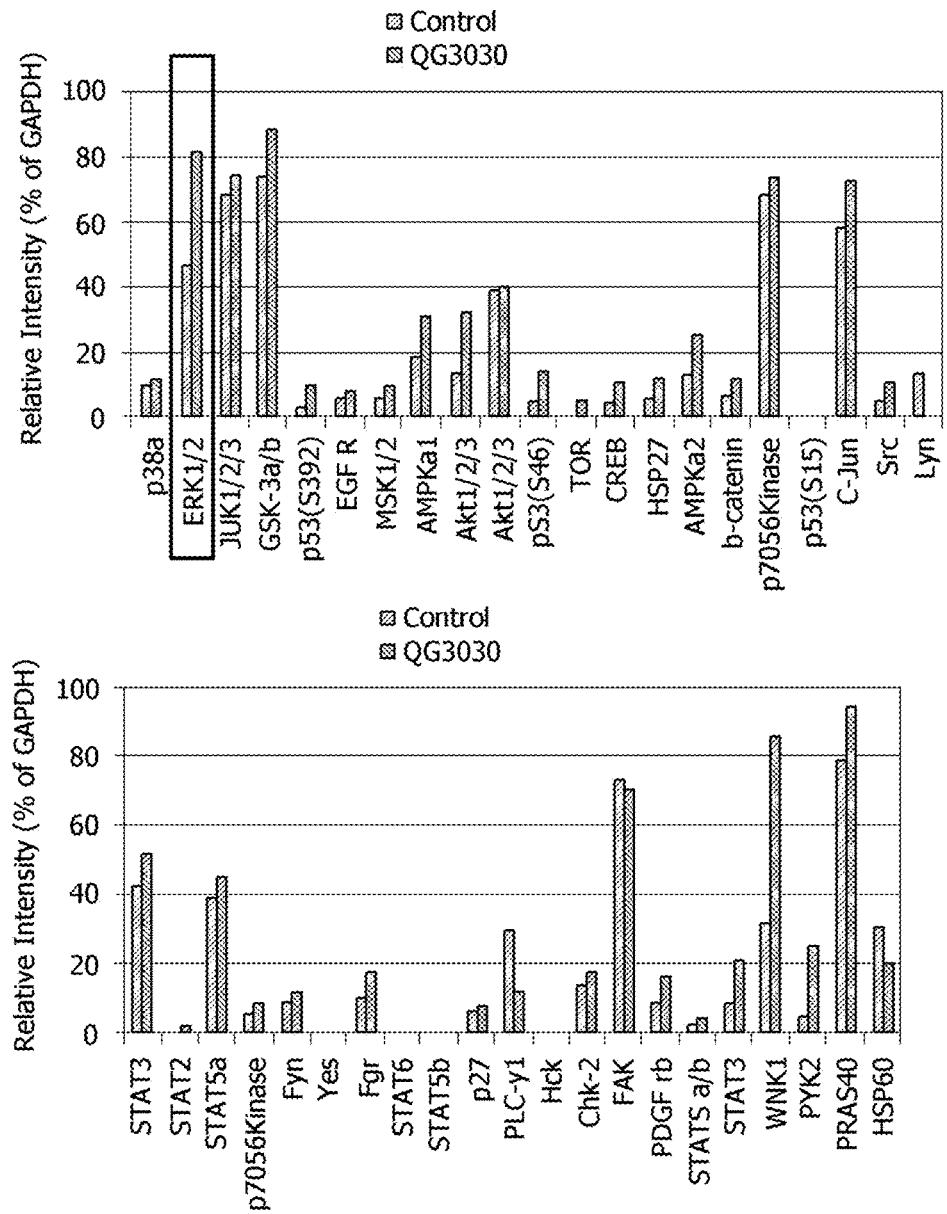
FIG. 5B is a graph showing the phosphorylation levels of FIG. 5A.

Based on the results of analysis, it can be seen that QG3030 strongly increased the phosphorylation of signaling molecules such as ERK, Akt, WNK1, and the like compared to the control DMSO (FIGS. 5A and 5B).

1-5. Confirmation of Mechanism of Differentiation of MSCs into Osteoblasts

To further study the mechanism by which QG3030 differentiates MSCs into osteoblasts, an experiment was performed using a kinase inhibitor.

After MSCs were cultured, the MSCs were simultaneously treated with a kinase inhibitor (1 µM) and QG3030 (1 µM). The next day, the medium was exchanged, and the MSCs were simultaneously treated again with the kinase inhibitor and QG3030. This procedure was repeated for 3 weeks, and the MSCs were then stained with Alizarin Red.

Figure 6:
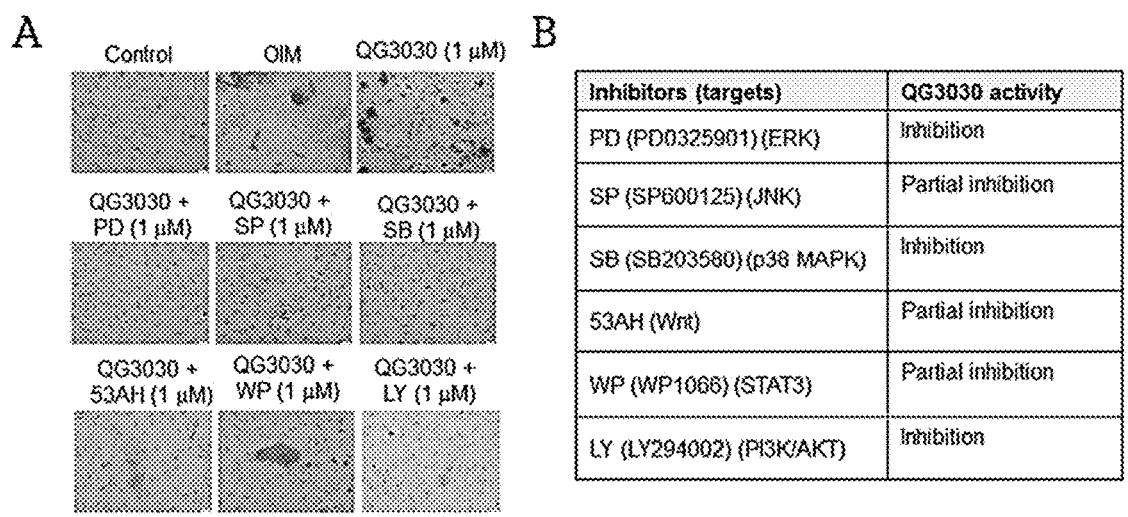
FIG. 6 shows the results of confirming calcium levels after mesenchymal stem cells are treated with a combination of the lappaconitine derivative (QG3030) and various kinase inhibitors.

As a result, it can be seen that the osteoblast differentiation ability of QG3030 was inhibited in the experimental group treated with a combination of QG3030 and the inhibitor, which inhibits ERK, P38, or Akt, compared to the QG3030-alone-treated group (FIG. 6). These results show that QG3030 is involved in the differentiation of MSCs into osteoblasts by activating the signaling of these enzymes.

1-6. Confirmation of Effect on ERK Phosphorylation in MSCs

Previous research shows that an MAP-kinase signaling mechanism including ERK and p38 plays an important role in the osteoblast differentiation (Greenblatt et al., MB, Annu Rev Cell Dev Biol. 2013). Similar to the results of previous research, the results of Experimental Example 1-5 show that QG3030 shows the potential to differentiate MSCs into osteoblasts through ERK and p38 MAP-kinases (FIG. 6). Also, the results of Experimental Example 1-4 show that QG3030 has the potential to induce osteoblast differentiation through the phosphorylation of ERK rather than p38 (FIGS. 5A and 5B). Accordingly, the level of the phosphorylated ERK according to time elapsed after MSCs were treated with QG3030 was determined.

Figure 7A:
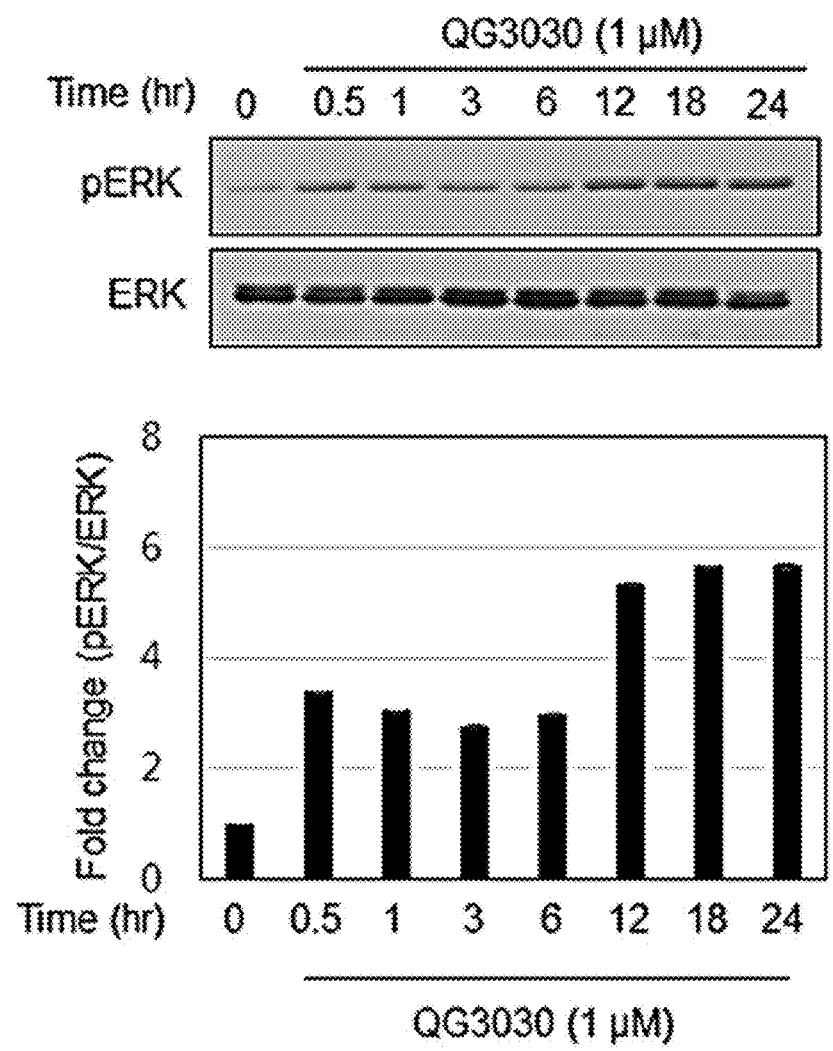
FIG. 7A shows the results of confirming a level of phosphorylated ERK (pERK) after mesenchymal stem cells are treated with the lappaconitine derivative (QG3030) for 0 to 24 hours.

As a result, it can be seen that the level of phosphorylated ERK (pERK) significantly increased within 30 minutes after QG3030 treatment, and specifically that the level of phosphorylated ERK (pERK) increased even after 24 hours after QG3030 treatment (FIG. 7A).

Figure 7B:
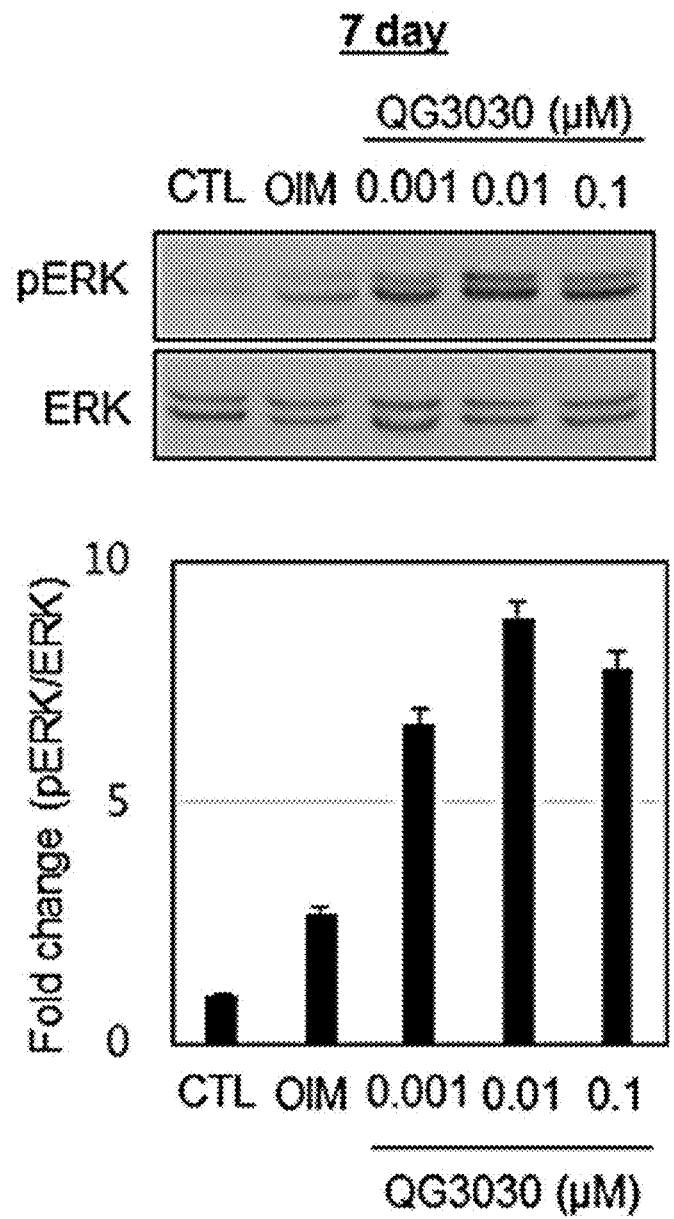
FIG. 7B shows the results of confirming a level of the phosphorylated ERK (pERK) after mesenchymal stem cells are treated with the lappaconitine derivative (QG3030) for 7 days.
Figure 7C:
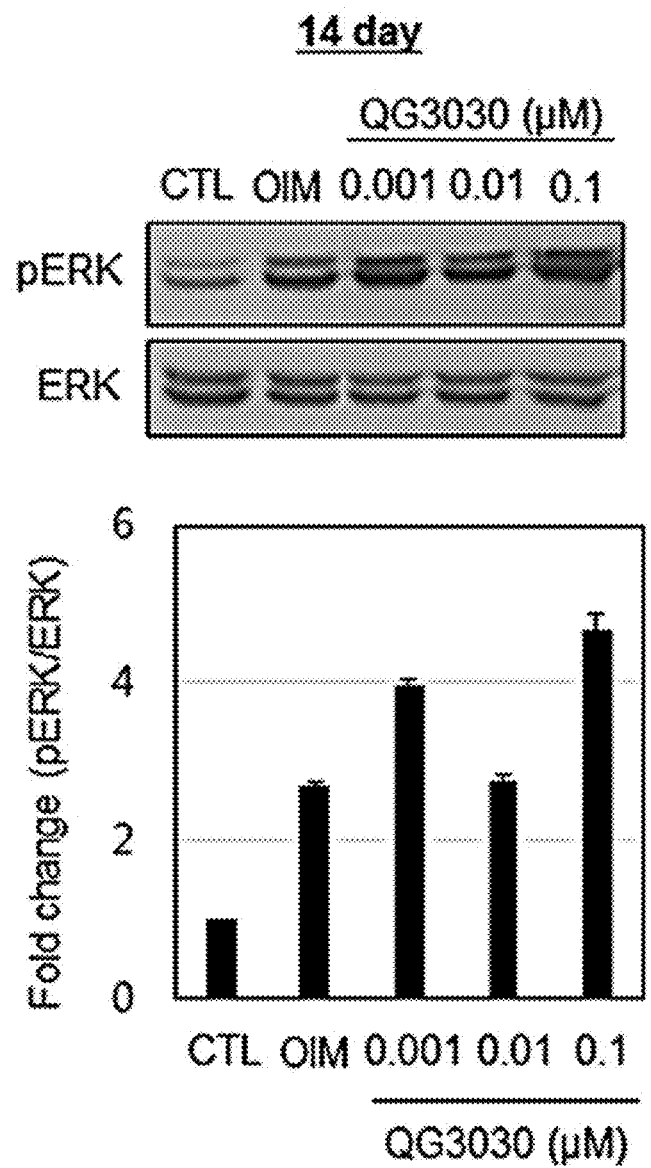
FIG. 7C shows the results of confirming a level of the phosphorylated ERK (pERK) after mesenchymal stem cells are treated with the lappaconitine derivative (QG3030) for 14 days.

Also, to determine whether QG3030 induces ERK phosphorylation for a long period, MSCs were treated with various concentrations (0.001, 0.01, and 0.1 µM) of QG3030, and the level of phosphorylated ERK (pERK) was checked after 7 days and 14 days. As a result, it was confirmed that the level of phosphorylated ERK (pERK) significantly increased in all the experimental groups treated with QG3030. In particular, it was confirmed that the level of phosphorylated ERK (pERK) increased to a level greater than that of the positive control (OIM) even at a low concentration. This tendency lasted until 14 days after QG3030 treatment, indicating that QG3030 increases ERK phosphorylation for a long period (FIGS. 7B and 7C).

These results indicate that the long-term activation of an ERK signaling mechanism by QG3030 is likely to be a key mechanism of the osteoblast differentiation ability of QG3030.

1-7. Confirmation of Effect of ERK Inhibitor on Increase in RUNX2 Expression by QG3030

ERK may induce the phosphorylation of RUNX2 to increase transcriptional activity and may be involved in stability to increase an amount of RUNX2 protein (Greenblatt et al., MB, Annu Rev Cell Dev Biol. 2013). Therefore, an increase in ERK phosphorylation by QG3030 may induce RUNX2 expression so that QG3030 can be involved in the differentiation of MSCs into osteoblasts. To verify this, an expression level of RUNX2 was determined after MSCs were treated with a combination of QG3030 (0.1 µM) and the ERK inhibitor PD98059 (50 µM).

Figure 8A:
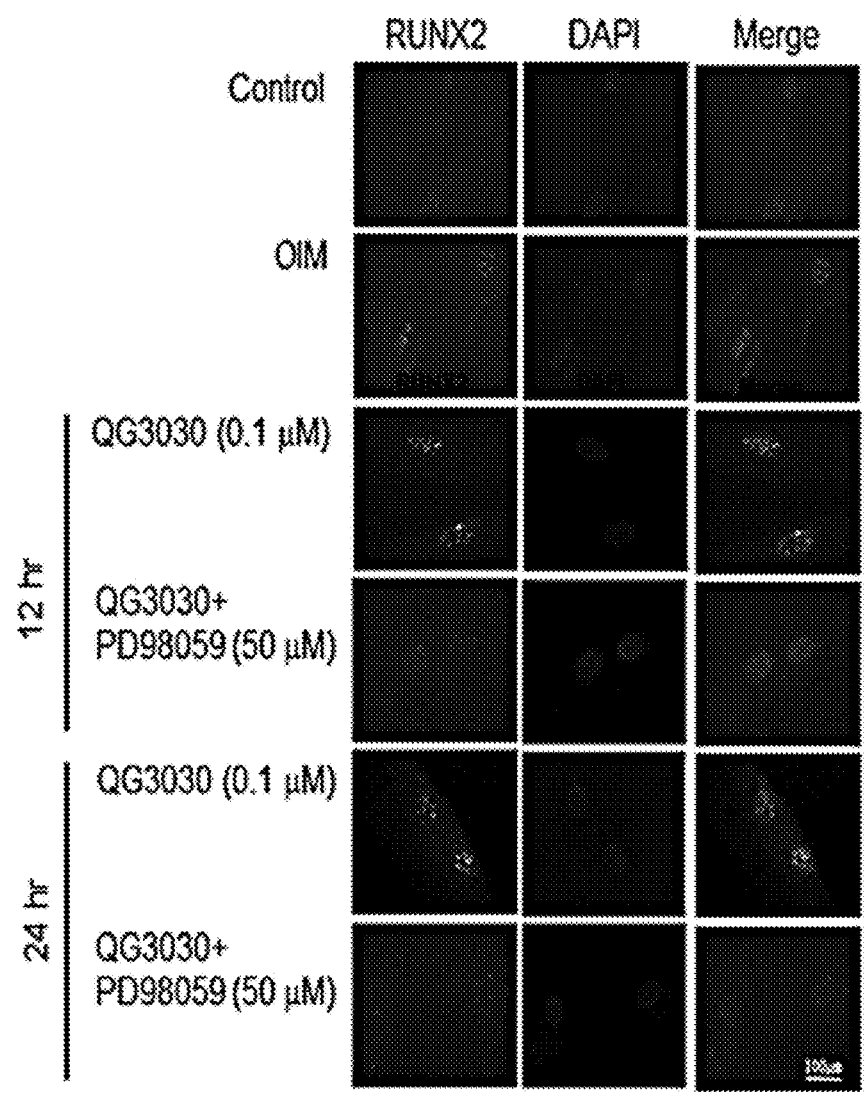
FIG. 8A shows the results of confirming a change in expression of RUNX2 using a fluorescence microscope after mesenchymal stem cells are treated with a combination of the lappaconitine derivative (QG3030) and an ERK inhibitor (PD98059).
Figure 8B:
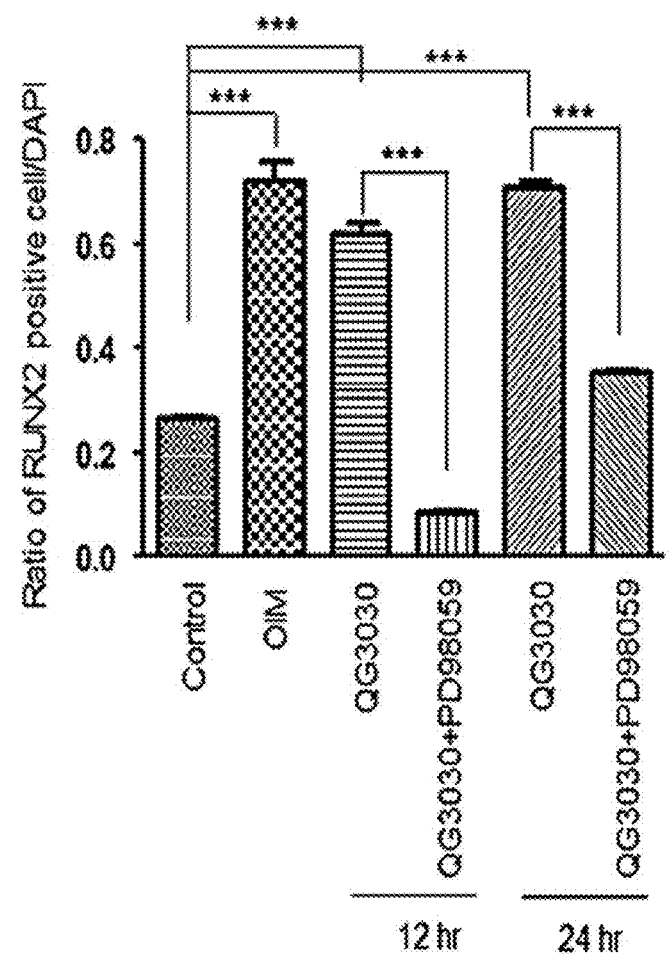
FIG. 8B is a graph showing the fluorescence levels of FIG. 8A.

As a result of confirmation, it can be seen that the expression of RUNX2 significantly increased within 12 hours after QG3030 treatment, but the expression of RUNX2 significantly decreased when MSCs were treated with a combination of QG3030 and the ERK inhibitor PD98059. The tendency was the same even 24 hours after QG3030 treatment (FIGS. 8A and 8B).

Figure 8C:
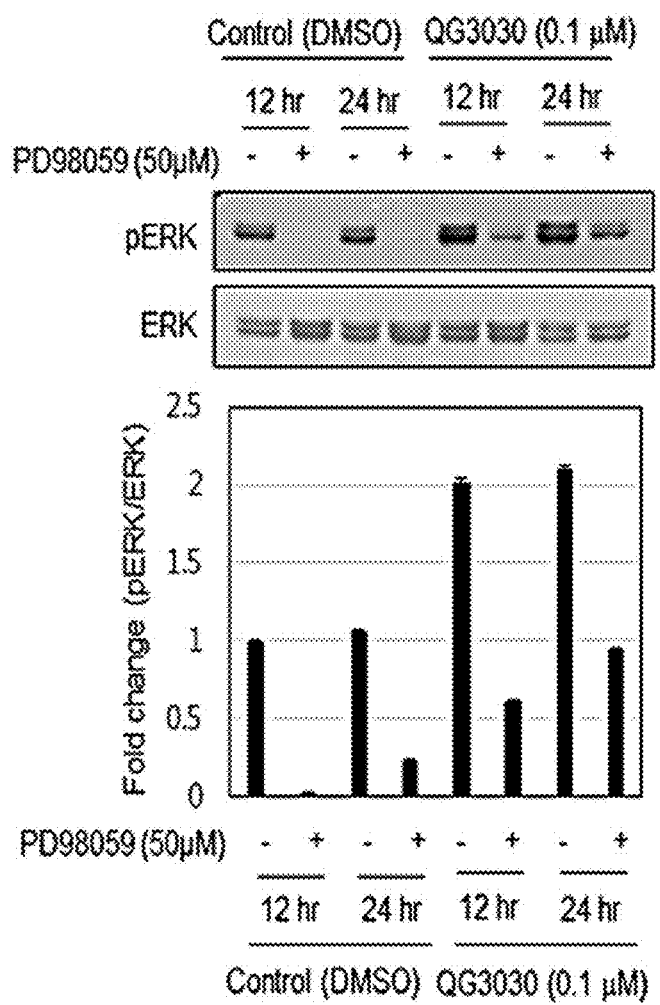
FIG. 8C shows the results of confirming a level of the phosphorylated ERK (pERK) after mesenchymal stem cells are treated with a combination of the lappaconitine derivative (QG3030) and the ERK inhibitor (PD98059).

As expected, QG3030 treatment also increased a phosphorylation level of ERK in MSCs, and an increase in the phosphorylation level of ERK was inhibited by PD98059 treatment (FIG. 8C).

Figure 9A:
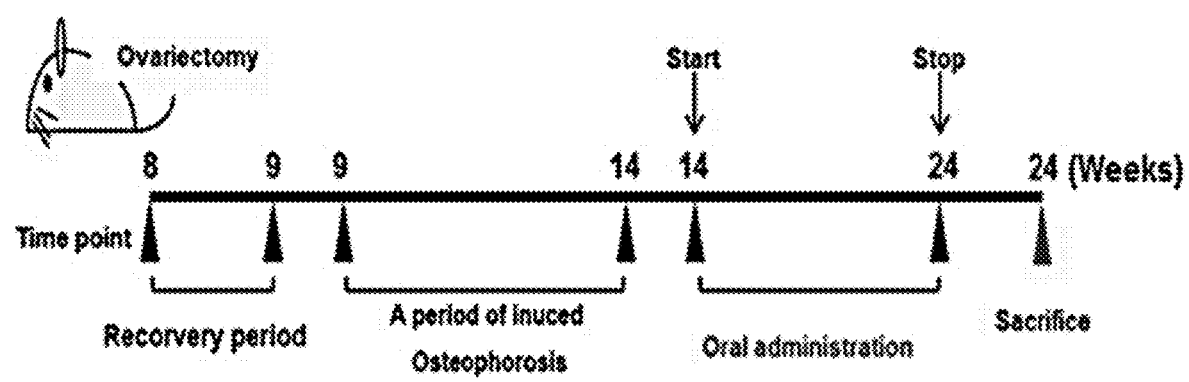
FIG. 9A shows the types of experimental groups and the schedule for administering the lappaconitine derivative (QG3030) to an animal model of osteoporosis.
Figure 9B:
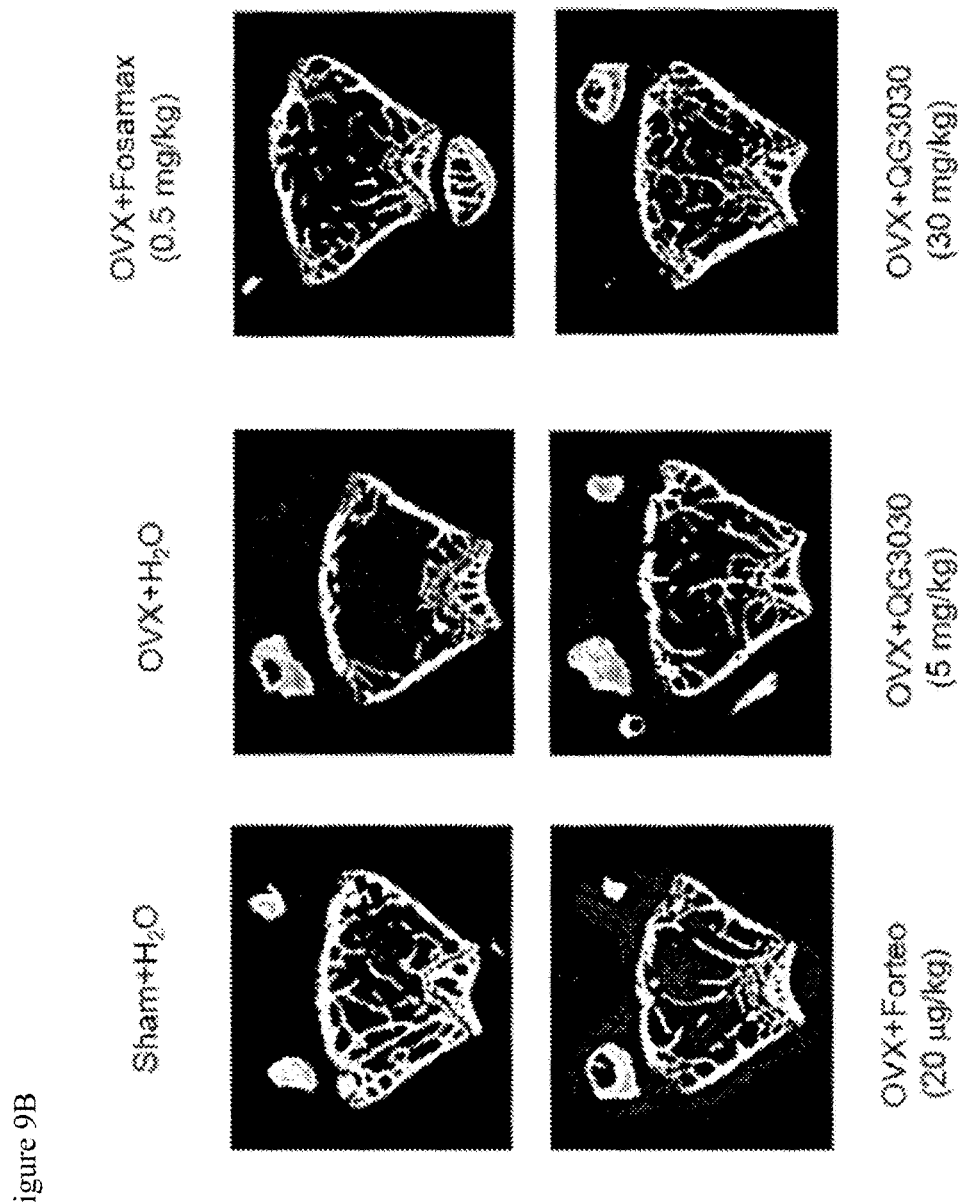
FIG. 9B shows the results of confirming the cross-sections of a femur after the lappaconitine derivative (QG3030) is administered into an animal model of osteoporosis.
Figure 9C:
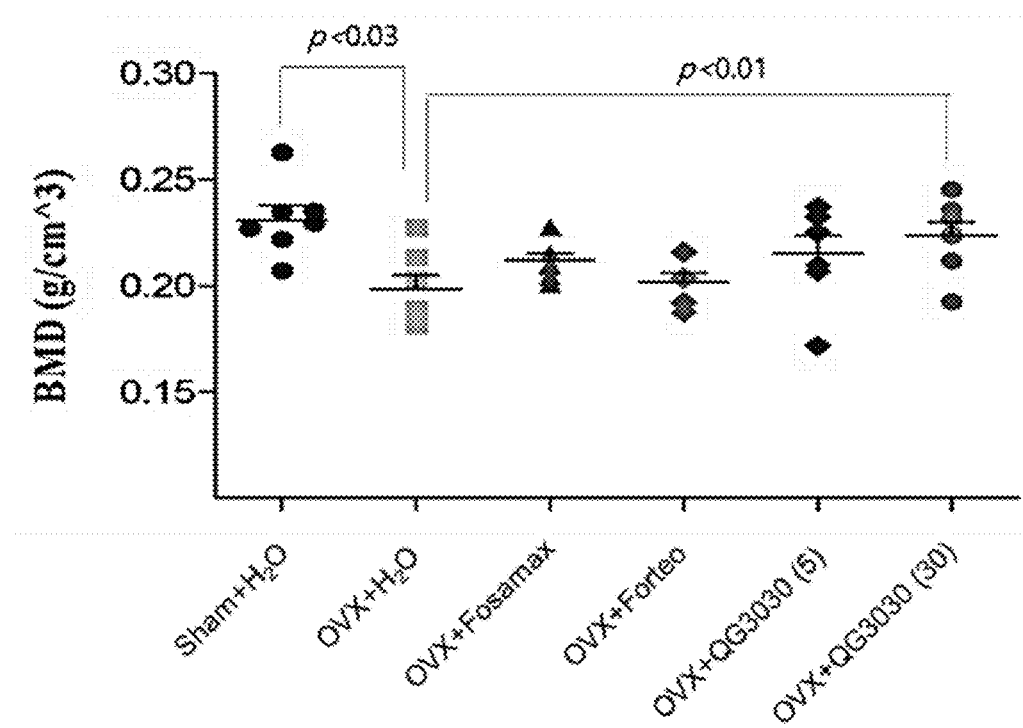
FIG. 9C shows the results of confirming the bone mineral density of a femur after the lappaconitine derivative (QG3030) is administered into the animal model of osteoporosis.

As a result of measurement, it was confirmed that the bone mineral density significantly increased in the QG3030-administered groups compared to the negative control, indicating that QG3030 had a therapeutic effect on osteoporosis. In this case, the effect of QG3030 was similar to that of Fosamax, and significantly superior to that of Forteo (FIGS. 9B and 9C).

Figure 10A:
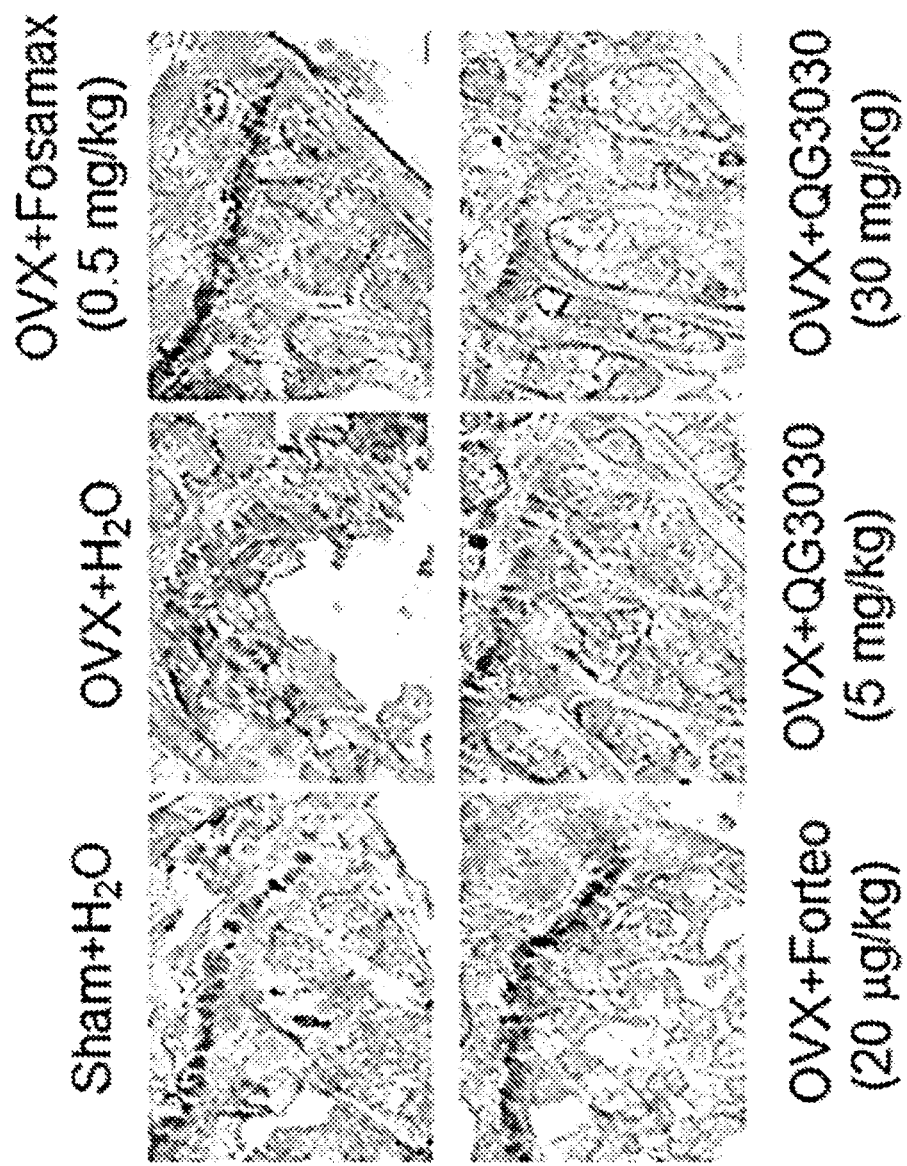
FIG. 10A shows the results of confirming a level of osteogenesis after the lappaconitine derivative (QG3030) is administered into the animal model of osteoporosis.
Figure 10B:
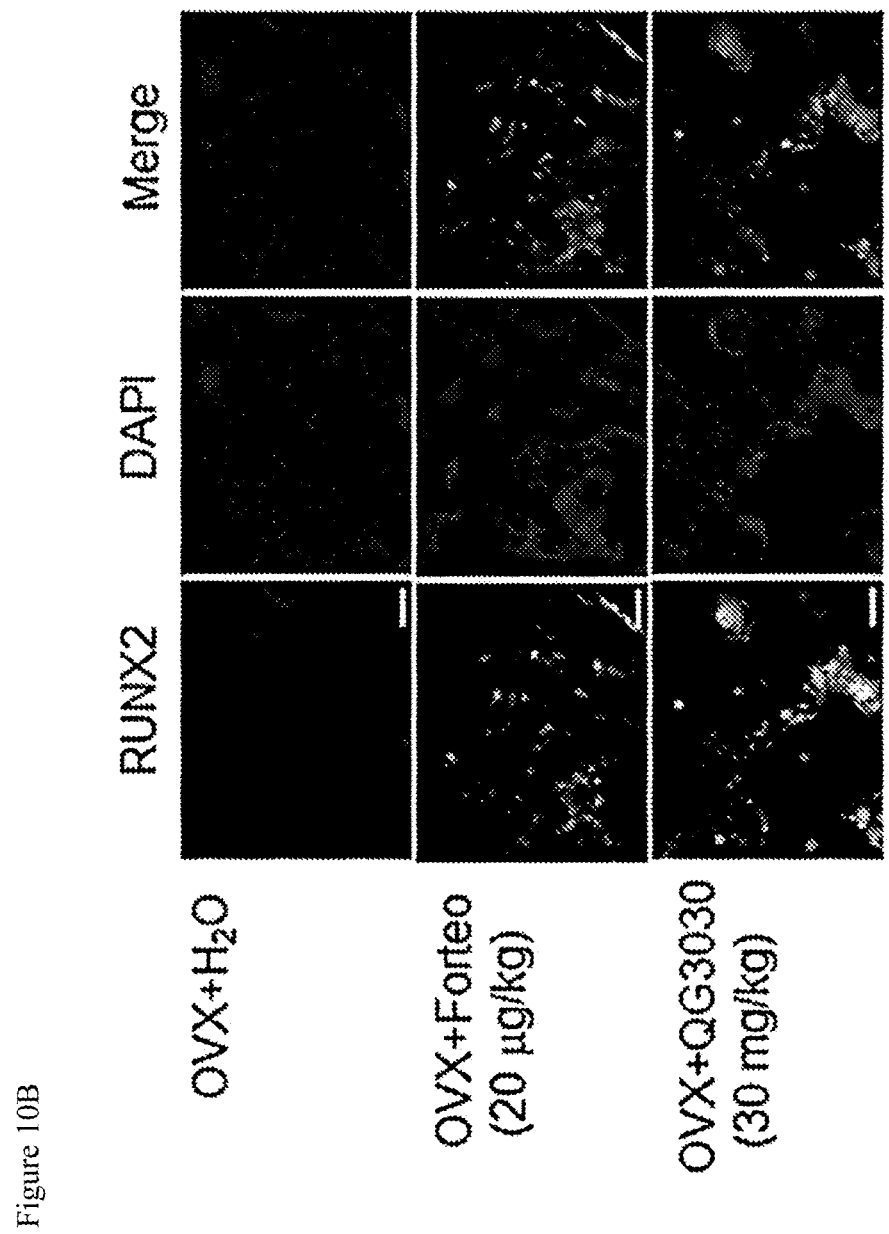
FIG. 10B shows the results of confirming an expression level of RUNX2 after the lappaconitine derivative (QG3030) is administered into the animal model of osteoporosis.

Based on the tissue staining results, it can also be seen that QG3030 induced osteogenesis in the femurs of ovariectomized mice (FIG. 10A), and the expression of RUNX2, which is a transcription factor involved in osteogenesis, also significantly increased (FIG. 10B).

The experimental results are summarized in Table 2 below. In Table 2, BMD represents bone mineral density, TV represents total volume, BV represents bone volume, Tb.Th represents trabecular thickness, and Tb.N represents trabecular number.

TABLE 2

| Group | BMD (g/cm^3) | TV (mm^3) | BV (mm^3) | BV/TV (%) | Tb. Th (1/mm) | Tb. N (mm) |
|---|---|---|---|---|---|---|
| Sham | 0.2303433 | 15.062852 | 1.225416 | 8.173108 | 0.078936 | 1.034056 |
| OVX | 0.1927733 | 14.942314 | 0.734676 | 4.959768 | 0.073672 | 0.670696 |
| Fosamax | 0.2135133 | 15.509586 | 1.017400 | 6.521050 | 0.069936 | 0.928632 |
| Forteo | 0.1997300 | 15.431426 | 0.879062 | 5.734686 | 0.071124 | 0.801822 |
| QG3030-5 mg | 0.2136333 | 16.571958 | 1.106886 | 6.712756 | 0.070814 | 0.947182 |
| QG3030-30 mg | 0.2300667 | 14.920258 | 1.155692 | 7.731468 | 0.074920 | 1.043926 |

The results show that the induction of ERK activation by QG3030 is a key mechanism of osteogenic activity.

Experimental Example 2: (In Vivo) Confirmation of Efficacy of QG3030

2-1. Confirmation of Therapeutic Ability of QG3030 Using Animal Model of Osteoporosis An ability of QG3030 to treat osteoporosis was confirmed in an animal model of ovariectomized (OVX) mice commonly used as an animal model of osteoporosis.

Figure 11:
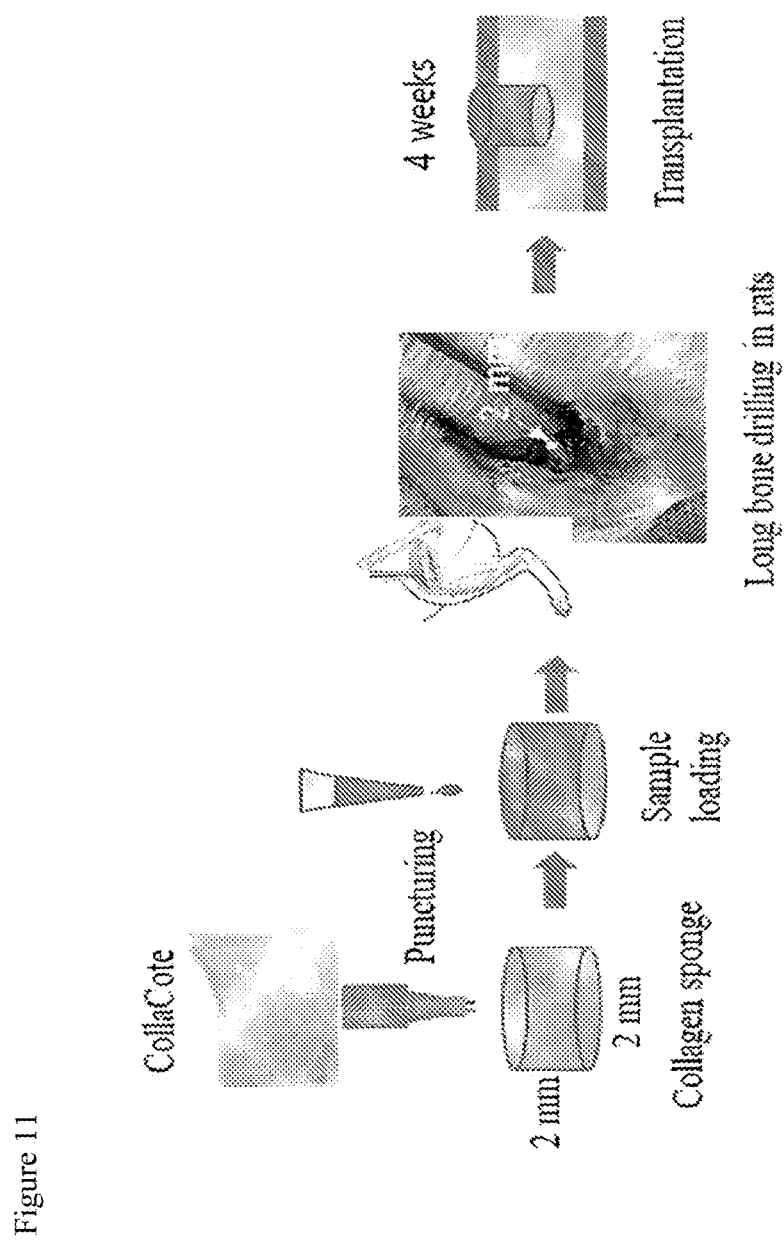
FIG. 11 is a schematic diagram showing a method of administering the lappaconitine derivative (QG3030) into the animal model of bone fracture.

2-2. Confirmation of Therapeutic Ability of QG3030 Using Animal Model of Bone Fracture The ilium of a Sprague Dawley (SD) rat was subjected to drilling with a diameter of 2 mm to induce a bone defect, and QG3030 (6, 30, and 150 µg/10 µL) mixed with an excipient (collagen sponge, CollaCote®) was implanted into a bone defect site to evaluate an osteoanagenic effect (FIG. 11). In this case, the positive control was treated with bone morphogenic protein-2 (BMP2), and the negative control was treated with DMSO (Table 3).

TABLE 3

| Animal group | Concentration | Animal number |
|---|---|---|
| Sham | | 5 |
| Fracture + DMSO | Collagen sponge + DMSO (10 uL) | 5 |
| Fracture + BMP2 | Collagen sponge + BMP2 (1 ug/10 uL) | 5 |
| Fracture + QG3030 (low) | Collagen sponge + QG3030 (6 ug/10 ul) | 5 |
| Fracture + QG3030 (middle) | Collagen sponge + QG3030 (30 ug/10 ul) | 5 |
| Fracture + QG3030 (high) | Collagen sponge + QG3030 (150 ug/10 ul) | 5 |

As the positive controls, parathyroid hormone (PTH)-based Forteo (Eli Lilly) used as an osteoporosis therapeutic agent through an osteogenesis-promoting mechanism, and alendronate-based Fosamax (Merck) serving as a bone resorption inhibitor were subcutaneously administered. As the negative control, water ($H_2O$) was orally administered, and QG3030 was orally administered at a concentration of 5 or 30 mg/kg (FIG. 9A). After the drug was administered daily for 10 weeks, the bone mineral density (BMD) was measured.

Figure 12A:
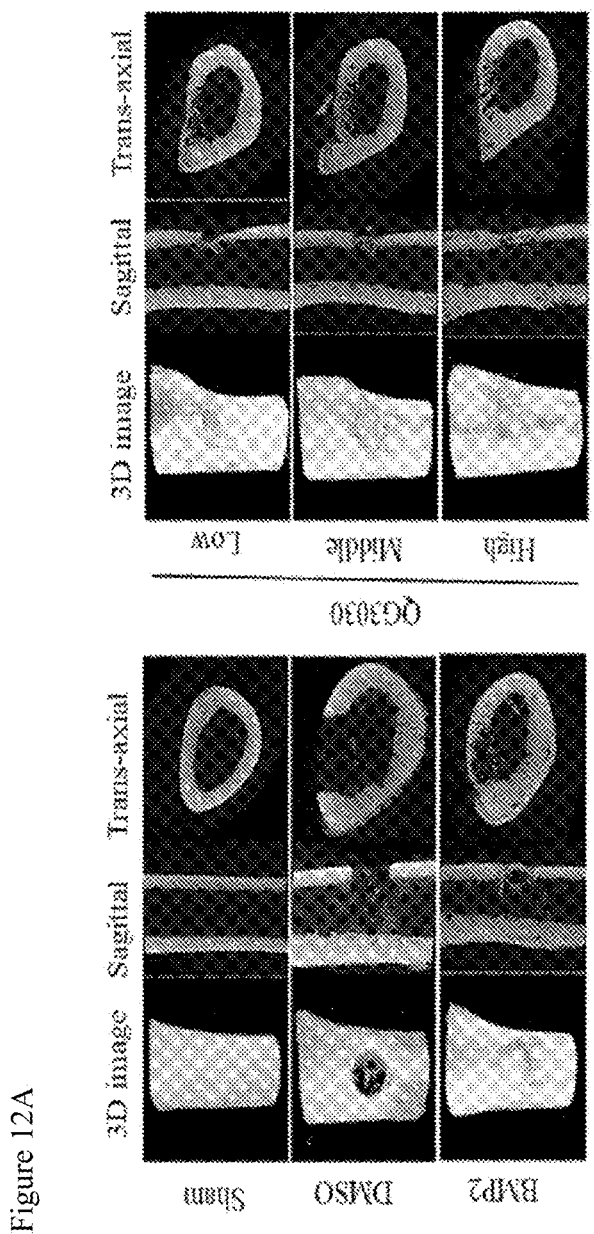
FIG. 12A shows the results of confirming the cross-sections of rat ilia after the lappaconitine derivative (QG3030) is administered into the animal model of bone fracture.

Based on the Micro-CT image reading results 4 weeks after implantation, it can be seen that QG3030 shows a level of osteoanagenic capacity similar to BMP2 at all concentrations (FIG. 12A).

To statistically quantify the osteoanagenic capacity of QG3030, a degree of osteogenesis was realized with a 3-D image, and a region of interest (ROI) was set to analyze parameters such as bone volume/total volume (BV/TV; %), trabecular thickness (Tb.Th; mm), trabecular number (Tb.N; 1/mm), and trabecular separation (Tb.Sp; mm).

Figure 12B:
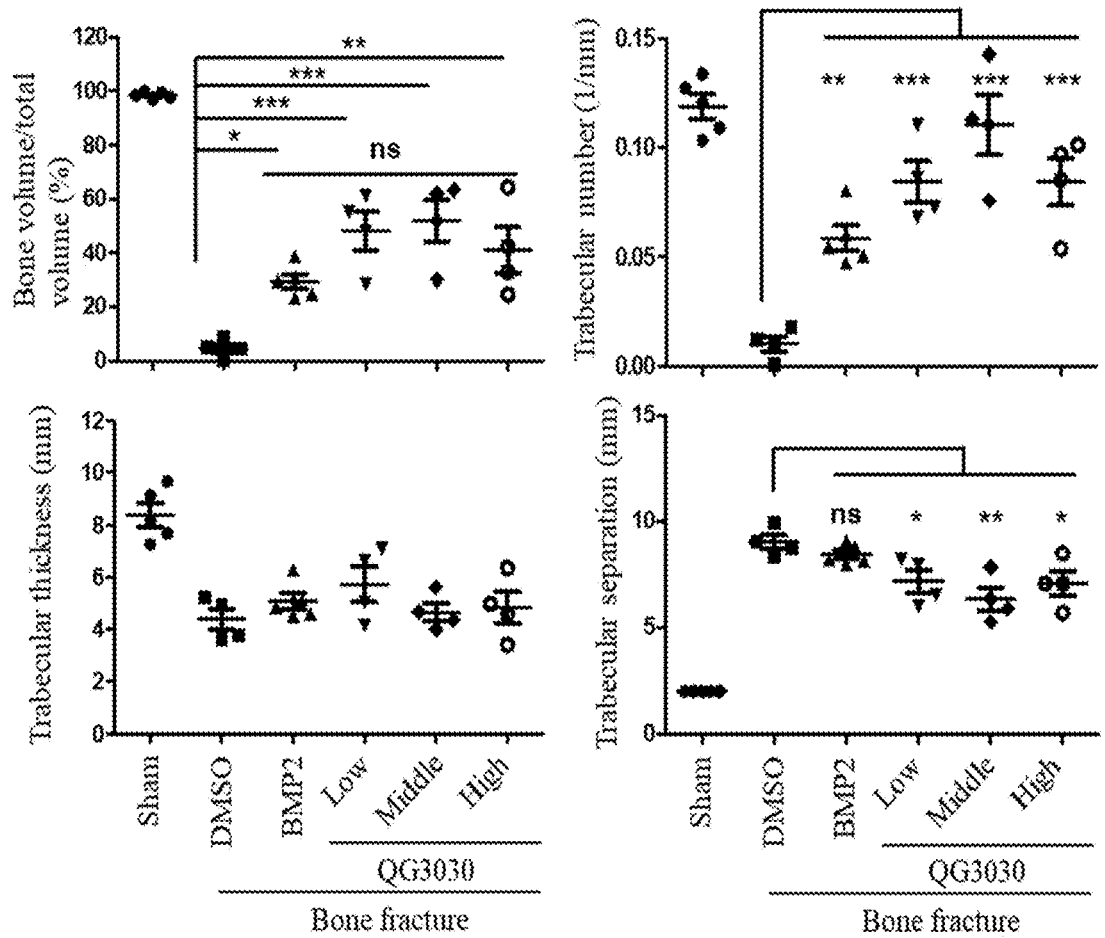
FIG. 12B shows the results of confirming osteogenesis degrees of the rat ilia after the lappaconitine derivative (QG3030) is administered into the animal model of bone fracture.

As a result, it can be seen that the bone volume/total volume (BV/TV) as a marker for osteogenesis increased to a similar level in the BMP2-treated group (positive control)

and QG3030-treated groups (low, medium, and high concentrations) compared to the negative control treated with DMSO (FIG. 12B).

From the analysis of the trabecular thickness (Tb.Th), the trabecular number (Tb.N), and the trabecular separation (Tb.Sp) to evaluate the bone quality of the generated bone tissue, it was also confirmed through the Tb.N and Tb.Sp other than Tb.Th that the high-quality bone tissue was statistically significantly formed in the BMP2-treated group (positive control) and QG3030-treated groups (low, medium, and high concentrations) compared to the DMSO-treated group (FIG. 12B). It is interesting to note that QG3030 generates a better quality of bone compared to BMP2 although there is no statistical significance. The indicators of statistical significance are *<0.05; <0.01; and *<0.001.

Figure 13:
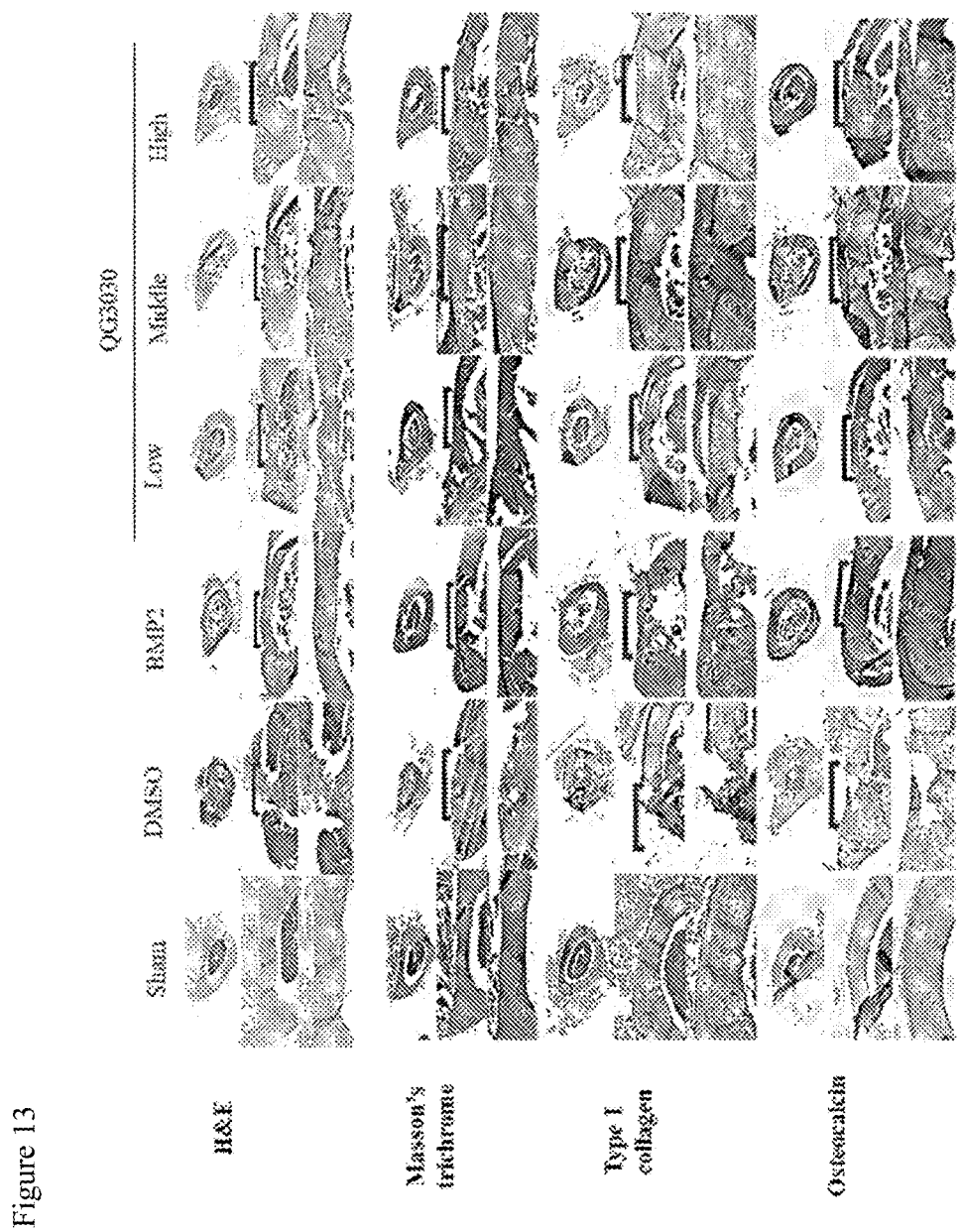
FIG. 13 shows the results of confirming a level of osteogenesis (A) and an expression level of collagen (B) after the lappaconitine derivative (QG3030) is administered into the animal model of bone fracture.

To verify the osteoanagenesis by QG3030 at the tissue level, tissue staining for cells (H&E, hematoxylin&eosin), collagen (Masson's trichrome), type I collagen, and osteocalcin was performed. As a result, it was confirmed that the markers were expressed at bone defect sites (indicated by solid lines) treated with QG3030 (low, medium, and high concentrations), and the effects was similar to that of BMP2 (FIG. 13).

The results of osteoanagenesis in this experimental example verify that QG3O3O possesses the same excellent osteoanagenic capacity as BMP2.

Based on the results, it was confirmed that the QG3030 compound of the present invention induces calcium and mineral production in MSCs, increases the expression of RUNX2, BMP-2, and osteocalcin, and induces ERK activation to induce osteoblast differentiation. Also, because the QG3030 compound increases bone mineral density when administered to the animal model of osteoporosis and induces osteogenesis in the animal model of bone fracture, the QG3030 compound may be effectively used for treating non-disease bone fractures caused by physical trauma as well as the bone-related disease such as osteoporosis.

Formulation Examples

Meanwhile, the novel compound QG3030 according to the present invention may be formulated into various forms according to a purpose. Hereinafter, methods of formulating a composition including the novel compound QG3030 of the present invention as an active ingredient are described for illustrative purposes, but the present invention is not limited thereto.

1. Tablet (Direct Pressing)

5.0 mg of the active ingredient was sieved, mixed with 14.1 mg of lactose, 0.8 mg of crospovidone USNF, and 0.1 mg of magnesium stearate, and then pressed to prepare tablets.

2. Tablet (Wet Assembly)

5.0 mg of the active ingredient was sieved, and then mixed with 16.0 mg of lactose and 4.0 mg of starch. 0.3 mg of polysorbate 80 was dissolved in pure water, and a suitable amount of this solution was then added to the mixture for granulation. After drying, fine granules were sieved, and then mixed with 2.7 mg of colloidal silicon dioxide and 2.0 mg of magnesium stearate. The fine granules were pressed to prepare tablets.

3. Powder and Capsule 5.0 mg of the active ingredient was sieved, and then mixed with 14.8 mg of lactose, 10.0 mg of polyvinyl pyrrolidone, and 0.2 mg of magnesium stearate. The mixture was filled into hard No. 5 gelatin capsules using a suitable device.

4. Injection 100 mg of the active ingredient, 180 mg of mannitol, and 26 mg of $Na_2HPO_4/H_2O$ were dissolved in 2,974 mg of distilled water to prepare an injection.

The invention claimed is:

1. A compound represented by the following Formula 1, and a stereoisomer, a hydrate, a solvate, or a pharmaceutically acceptable salt thereof:

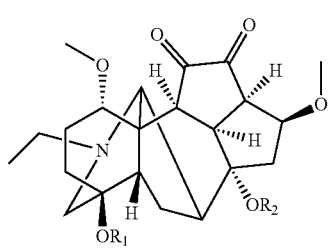

[Formula 1]

wherein $R_1$ and $R_2$ are each independently selected from the group consisting of hydrogen, a C1-C6 alkyl, a thioalkyl, an arylalkyl, a hydroxyalkyl, a dihydroxyalkyl, a hydroxy alkylarylalkyl, a dihydroxyalkylarylalkyl, an alkoxyalkyl, an acyloxyalkyl, an aminoalkyl, an alkylaminoalkyl, an alkoxycarbonylaminoalkyl, an acylaminoalkyl, an arylsulfoneamidoalkyl, an allyl, a dihydroxyalkylallyl, a dioxolanylallyl, a caralkoxyalkyl, methyl, ethyl, isopropyl, t-butyl, and phenyl.

2. A pharmaceutical composition for preventing or treating a bone-related disease, comprising a compound represented by the following Formula 1, and a stereoisomer, a hydrate, a solvate, or a pharmaceutically acceptable salt thereof as an active ingredient:

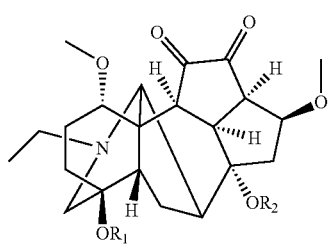

[Formula 1]

wherein $R_1$ and $R_2$ are each independently selected from the group consisting of hydrogen, a C1-C6 alkyl, a thioalkyl, an arylalkyl, a hydroxyalkyl, a dihydroxyalkyl, a hydroxy alkylarylalkyl, a dihydroxyalkylarylalkyl, an alkoxyalkyl, an acyloxyalkyl, an aminoalkyl, an alkylaminoalkyl, an alkoxycarbonylaminoalkyl, an acylaminoalkyl, an arylsulfoneamidoalkyl, an allyl, a dihydroxyalkylallyl, a dioxolanylallyl, a caralkoxyalkyl, methyl, ethyl, isopropyl, t-butyl, and phenyl.

3. The pharmaceutical composition of claim 2, wherein the bone-related disease is selected from the group consisting of osteoporosis, bone fractures, rheumatoid arthritis, periodontitis, osteomalacia, osteopenia, bone atrophy, osteoarthritis, bone defects, osteolysis, and osteonecrosis.

4. The pharmaceutical composition of claim 2, wherein the compound represented by Formula 1 promotes the differentiation of stem cells into osteoblasts.

5. The pharmaceutical composition of claim 2, wherein the compound represented by Formula 1 increases the expression of an osteogenic marker selected from the group consisting of runt-related transcription factor 2 (RUNX2), bone morphogenetic protein 2 (BMP2), and osteocalcin.

6. A food composition for preventing or ameliorating a bone-related disease, comprising the compound of claim 1 as an active ingredient.

7. The food composition of claim 6, wherein the compound represented by Formula 1 promotes the differentiation of stem cells into osteoblasts.

8. A method of synthesizing the compound of claim 1, comprising:
  (a) allowing lappaconitine to react with an oxidizing agent; and
  (b) allowing the reaction product of (a) to react with an organic solvent in the presence of a base.

9. The method of claim 8, wherein the oxidizing agent of (a) is selected from the group consisting of phenyliodine diacetate ($PhI(OAc)_2$), lead (II) acetate ($Pb(CH_3CO_2)_2$), lead (II) acetate ($Pb(CH_3CO_2)_4$), ozone, and $HIO_4$.

10. The method of claim 8, wherein the base of (b) is selected from the group consisting of sodium hydroxide, potassium carbonate, sodium carbonate, cesium carbonate, and potassium hydroxide.

11. The method of claim 8, wherein the organic solvent of (b) is an aliphatic alcohol or an alkoxy alcohol.

12. A method of treating a bone-related disease, comprising:
  administering the pharmaceutical composition of claim 2 to a subject in need of treatment.

* * * * *